(12) United States Patent
Andringa et al.

(10) Patent No.: US 11,186,010 B2
(45) Date of Patent: Nov. 30, 2021

(54) SUPPORT STRUCTURE FOR CONCRETE MIXER VEHICLE

(71) Applicant: Oshkosh Corporation, Oshkosh, WI (US)

(72) Inventors: Jeremy Andringa, Oshkosh, WI (US); Eric Wall, Oshkosh, WI (US); Doug Schmidt, Oshkosh, WI (US); Dale Fasana, Oshkosh, WI (US); Jon Zeamer, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 96 days.

(21) Appl. No.: 16/813,072

(22) Filed: Mar. 9, 2020

(65) Prior Publication Data

US 2020/0290238 A1 Sep. 17, 2020

Related U.S. Application Data

(60) Provisional application No. 62/817,347, filed on Mar. 12, 2019, provisional application No. 62/817,367, filed on Mar. 12, 2019.

(51) Int. Cl.
*B28C 5/42* (2006.01)
*B28C 5/18* (2006.01)
*B60P 3/16* (2006.01)

(52) U.S. Cl.
CPC .......... *B28C 5/4265* (2013.01); *B28C 5/1856* (2013.01); *B28C 5/4272* (2013.01); *B60P 3/16* (2013.01)

(58) Field of Classification Search
CPC ... B28C 5/4265; B28C 5/1856; B28C 5/4272; B60P 3/16
(Continued)

(56) References Cited

U.S. PATENT DOCUMENTS

| | | | | |
|---|---|---|---|---|
| 2,722,408 | A | * | 11/1955 | Hilkemeier ........... B28C 5/4265 366/63 |
| 3,190,621 | A | * | 6/1965 | Green ................... B28C 5/4272 366/68 |

(Continued)

FOREIGN PATENT DOCUMENTS

| | | | |
|---|---|---|---|
| DE | 102014211992 A1 * | 12/2015 | ......... E04G 21/0436 |
| DE | 102014211999 A1 * | 12/2015 | ......... E04G 21/0436 |

(Continued)

*Primary Examiner* — Charles Cooley
(74) *Attorney, Agent, or Firm* — Foley & Lardner LLP

(57) ABSTRACT

A concrete mixer vehicle comprises a chassis, an engine, a cab, a drum assembly, a front roller pedestal, a transmission mounting bracket assembly, and a rear pedestal. The chassis has a frame. The drum assembly includes a mixing drum, a drum driver, and a hopper assembly. The front roller pedestal is configured to support a front end of the mixing drum. The front roller pedestal includes a support member configured to provide support to the front roller pedestal in a longitudinal direction with respect to a longitudinal axis of the frame. The rear pedestal is configured to support a rear end of the mixing drum. The rear pedestal includes a first bar-pin member and a second bar-pin member configured to couple the rear pedestal in a first installation position or a second installation position based on a length of the mixing drum.

20 Claims, 18 Drawing Sheets

(58) Field of Classification Search
USPC .......................................... 366/62–63, 233
See application file for complete search history.

(56) References Cited

U.S. PATENT DOCUMENTS

| | | | | |
|---|---|---|---|---|
| 3,603,565 | A * | 9/1971 | Johnson | B28C 5/4265 |
| | | | | 366/62 |
| 4,461,577 | A * | 7/1984 | Mechem | B60P 3/16 |
| | | | | 366/55 |
| 4,575,254 | A * | 3/1986 | Johnston | B28C 5/4265 |
| | | | | 248/582 |
| 5,538,274 | A | 7/1996 | Schmitz et al. | |
| 2008/0205188 | A1 | 8/2008 | Lindblom et al. | |
| 2009/0154287 | A1 | 6/2009 | Lindblom et al. | |
| 2011/0058446 | A1 | 3/2011 | Khouri | |
| 2013/0107656 | A1 | 5/2013 | Datema et al. | |
| 2014/0010035 | A1 * | 1/2014 | Takahashi | B28C 5/4217 |
| | | | | 366/61 |
| 2014/0269146 | A1 | 9/2014 | Harris et al. | |
| 2015/0151651 | A1 | 6/2015 | Stingle et al. | |
| 2015/0246331 | A1 | 9/2015 | Broker et al. | |
| 2015/0367300 | A1 * | 12/2015 | McNeilus | B28C 5/4265 |
| | | | | 366/41 |
| 2017/0361491 | A1 | 12/2017 | Datema et al. | |
| 2017/0361492 | A1 | 12/2017 | Datema et al. | |
| 2018/0250847 | A1 | 9/2018 | Wurtz et al. | |
| 2019/0091890 | A1 | 3/2019 | Rocholl et al. | |
| 2019/0217698 | A1 | 7/2019 | Broker et al. | |
| 2019/0276102 | A1 | 9/2019 | Zuleger et al. | |
| 2019/0344475 | A1 | 11/2019 | Datema et al. | |
| 2020/0078986 | A1 | 3/2020 | Clifton et al. | |
| 2020/0230841 | A1 | 7/2020 | Datema et al. | |
| 2020/0230842 | A1 | 7/2020 | Datema et al. | |
| 2020/0290238 | A1 * | 9/2020 | Andringa | B28C 5/4265 |

FOREIGN PATENT DOCUMENTS

| | | | | |
|---|---|---|---|---|
| WO | WO-2005070637 A2 * | 8/2005 | | B28C 5/4265 |
| WO | WO-2020003507 A1 * | 1/2020 | | B60P 3/16 |

* cited by examiner

SUPPORT STRUCTURE FOR CONCRETE MIXER VEHICLE

CROSS-REFERENCE TO RELATED PATENT APPLICATION

This application claims the benefit of U.S. Provisional Application No. 62/817,347, filed Mar. 12, 2019, and U.S. Provisional Application No. 62/817,367, filed Mar. 12, 2019, each of which is incorporated herein by reference in its entirety.

BACKGROUND

Concrete mixer vehicles are configured to receive, mix, and transport wet concrete or a combination of ingredients that when mixed form wet concrete to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One embodiment relates to a concrete mixer vehicle. The concrete mixer vehicle comprises a chassis, an engine, a cab, a drum assembly, a front roller pedestal, a transmission mounting bracket assembly, and a rear pedestal. The chassis has a frame. The engine is coupled to the frame. The cab is coupled to the frame. The cab defines an interior compartment. The drum assembly includes a mixing drum, a drum driver, and a hopper assembly. The mixing drum defines an aperture and an internal volume. The drum driver is configured to selectively rotate the mixing drum relative to the chassis. The hopper assembly is configured to introduce materials into and allow the materials to flow out of the internal volume of the mixing drum. The front roller pedestal is coupled to the frame and is configured to support a front end of the mixing drum. The rear pedestal is coupled to the frame and is configured to support a rear end of the mixing drum. The rear pedestal has a pedestal frame, a first mounting bracket, a second mounting bracket, a coupling brace, a first bar-pin member, and a second bar-pin member. The pedestal frame has a first frame end and a second frame end. The first frame end is coupled to and supports the drum driver. The second frame end is disposed opposite the first frame end and includes a first interface joint and a second interface joint. The first interface joint is coupled to the frame by the first mounting bracket and the second interface joint is coupled to the frame by the second mounting bracket. The coupling brace is coupled to the pedestal frame proximate the first frame end. Each of the first bar-pin member and the second bar-pin member is coupled to the coupling brace at a first end and to the transmission mounting bracket assembly at a second end.

Another embodiment relates to a concrete mixer vehicle. The concrete mixer vehicle comprises a chassis, an engine, a cab, a drum assembly, a front roller pedestal, and a rear pedestal. The chassis has a frame. The engine is coupled to the frame. The cab is coupled to the frame. The cab defines an interior compartment. The drum assembly includes a mixing drum, a drum driver, and a hopper assembly. The mixing drum defines an aperture and an internal volume. The drum driver is configured to selectively rotate the mixing drum relative to the chassis. The hopper assembly is configured to introduce materials into and allow the materials to flow out of the internal volume of the mixing drum. The front roller pedestal is coupled to the frame and is configured to support a front end of the mixing drum. The front roller pedestal includes a pedestal frame, a first mounting bracket, a second mounting bracket, and a support member. The pedestal frame has an upper portion and a lower portion. The upper portion includes a pair of drum drive rollers configured to receive and facilitate rolling of the mixing drum. The lower portion includes a first interface joint coupled to the frame by the first mounting bracket and a second interface joint coupled to the frame by the second mounting bracket. The support member has a first end and a second end. The first end of the support member is coupled to the upper portion of the pedestal frame and the second end of the support member is coupled to the frame of the chassis. The support member is configured to provide support to the pedestal frame in a longitudinal direction with respect to a longitudinal axis of the frame. The rear pedestal is coupled to the frame and is configured to support a rear end of the mixing drum.

Still another embodiment relates to a concrete mixer vehicle. The concrete mixer vehicle comprises a chassis, an engine, a cab, a drum assembly, a front roller pedestal, a transmission mounting bracket assembly, and a rear pedestal. The chassis has a frame. The engine is coupled to the frame. The cab is coupled to the frame. The cab defines an interior compartment. The drum assembly includes a mixing drum, a drum driver, and a hopper assembly. The mixing drum defines an aperture and an internal volume. The drum driver is configured to selectively rotate the mixing drum relative to the chassis. The hopper assembly is configured to introduce materials into and allow the materials to flow out of the internal volume of the mixing drum. The front roller pedestal is coupled to the frame and is configured to support a front end of the mixing drum. The front roller pedestal includes a front pedestal frame, a first front mounting bracket, a second front mounting bracket, and a support member. The front pedestal frame has an upper portion and a lower portion. The upper portion includes a pair of drum drive rollers configured to receive and facilitate rolling of the mixing drum. The lower portion is coupled to the frame by the first front mounting bracket and the second front mounting bracket. The support member is configured to provide support to the front pedestal frame in a longitudinal direction with respect to a longitudinal axis of the frame. The rear pedestal is coupled to the frame and is configured to support a rear end of the mixing drum. The rear pedestal has a rear pedestal frame, a first rear mounting bracket, a second rear mounting bracket, a coupling brace, a first bar-pin member, and a second bar-pin member. The rear pedestal frame has a first frame end and a second frame end. The first frame end is coupled to and supports the drum driver. The second frame end is disposed opposite the first frame end and is coupled to the frame by the first rear mounting bracket and the second rear mounting bracket. The coupling brace is coupled to the rear pedestal frame proximate the first frame end. Each of the first bar-pin member and the second bar-pin member is coupled to the coupling brace at a first end and to the transmission mounting bracket assembly at a second end.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
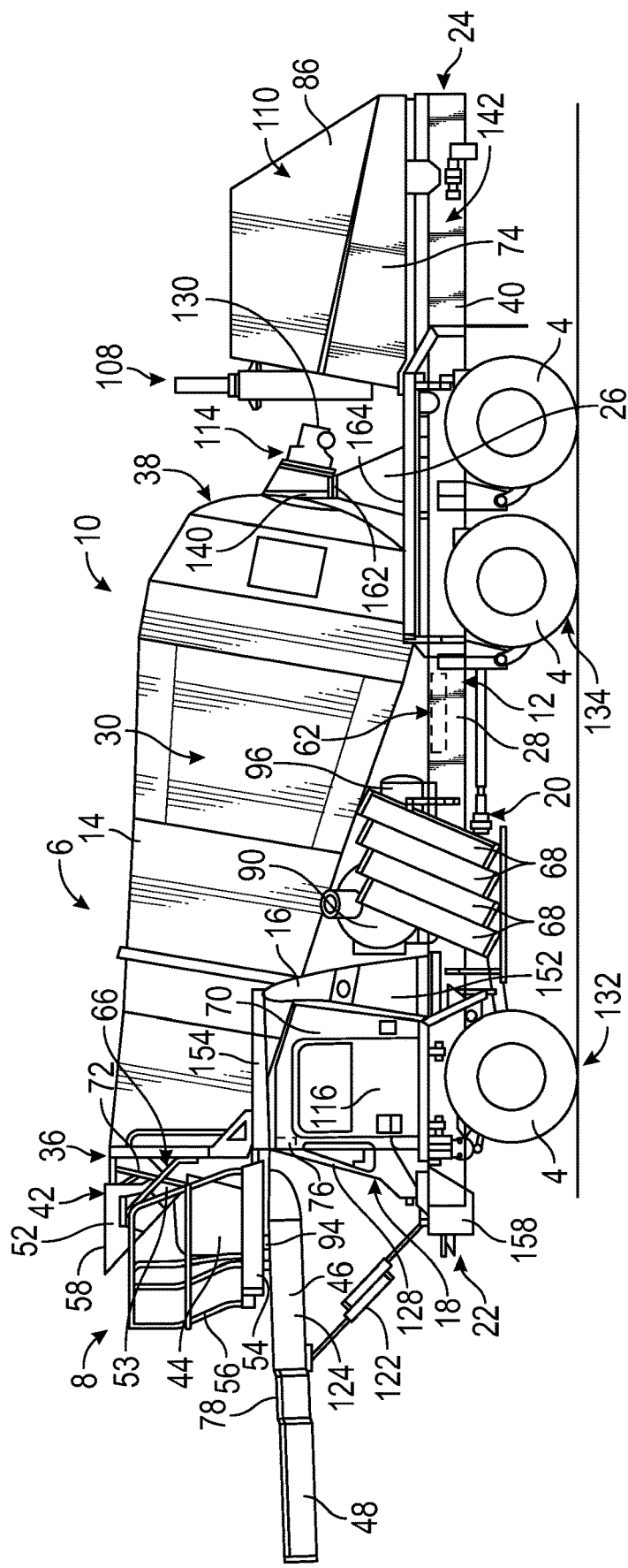
FIG. 1 is a side view of a concrete mixer truck, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a rear drive pedestal that implements a four-point mount is described. The rear drive pedestal is configured to be fastened with bar pin bushings to a transmission mounting bracket that allow for several degrees of movement with the drum assembly. The rear drive pedestal may be bolted at a first installation location (e.g., short drum configuration) or a second installation location (e.g., long drum configuration). The rear drive pedestal is configured to isolate the rear drive pedestal from the frame to reduce stress during articulation and other driving scenarios of the concrete mixer truck by allowing the rear drive pedestal to move slightly relative to the frame.

According to an exemplary embodiment, a front roller pedestal having either a curved support frame or a straight support frame is described. The front roller pedestal implements a three-point mount. The front roller pedestal is configured to include a support member from the pedestal frame to provide longitudinal stability and allow the pedestal frame to be narrower in design. The three points of contact—the support member, a first mounting bracket on the first lateral side, and a second mounting bracket on the second lateral side—decrease the restriction within the mounting structure of the front roller pedestal and drive less stress into the frame and pedestal components compared to a traditional configuration having four points of contact. Beneficially, the curved support frame extends over the water tank and allows the front roller pedestal to be much narrower in design. Additionally, coupling the pedestal frame to the web of the frame, as opposed to conventional front pedestals that are coupled to a top of a flange of the frame allows for a better disbursement of stress into the frame.

According to an exemplary embodiment, a hopper assembly with a chute motor and gear assembly positioned away from potential concrete discharge is described. Conventional concrete mixer drums have a tendency to have concrete build up on a right hand side (e.g., from the perspective of an operator looking out of the front of the cab of the concrete mixer truck) of the hopper assembly as a result of the clockwise rotation (e.g., looking at the mixer drum from in front of the concrete mixer truck) of the mixer drum during discharge and movement of components and/or concrete mixer truck during discharge. This spillover concrete may cover and block operation by a chute motor and gear assembly positioned on the right hand side of the chute assembly. Conversely, the chute motor and gear assembly described herein is positioned on the left hand side (e.g., from the perspective of the operator looking out of the front of the cab of the concrete mixer truck) of the hopper assembly to alleviate concrete spillover onto the chute motor and gear assembly and to provide ease of access and service on an adjacent ladder.

According to an exemplary embodiment, a superstructure that includes support structures and an operator ladder that improve driver visibility, increase driver perspective, and minimize blind spots is described. The operator ladder may include a ladder rail that couples to the ladder rungs at an angle such that the ladder rail is generally parallel to the driver's sight line. Beneficially, the superstructure components improve visibility and operability for when the operator is pouring concrete and controlling the chute assembly. A larger, curved windshield may be implemented within the cab to provide greater visibility. To maximize visibility the windshield may be a single piece of glass that mounts to vertical pillars and slopes forward to allow space for the instrument panel. The pillars, superstructure, and ladder support have been located to minimize view obstruction in the corner.

According to an exemplary embodiment, bar-pin bushing support elements and/or torque rod ends are implemented with a superstructure to provide support to the superstructure platform while still allowing movement during chassis articulation is described. The bar-pin bushing support element reduces the impact load on the superstructure from chassis inputs. The bar-pin bushing support elements reduce superstructure noise and rattling audible in the cab, thereby increasing driver comfort. The bar-pin bushing support elements further reduce vibration of the side-view mirrors, thereby increasing visibility. Contrary to conventional systems that implement a bolted, welded, and rigid design, the bar-pin bushing support elements include bushings that are replaceable and provide serviceable components to the superstructure.

Overall Vehicle

Figure 2:
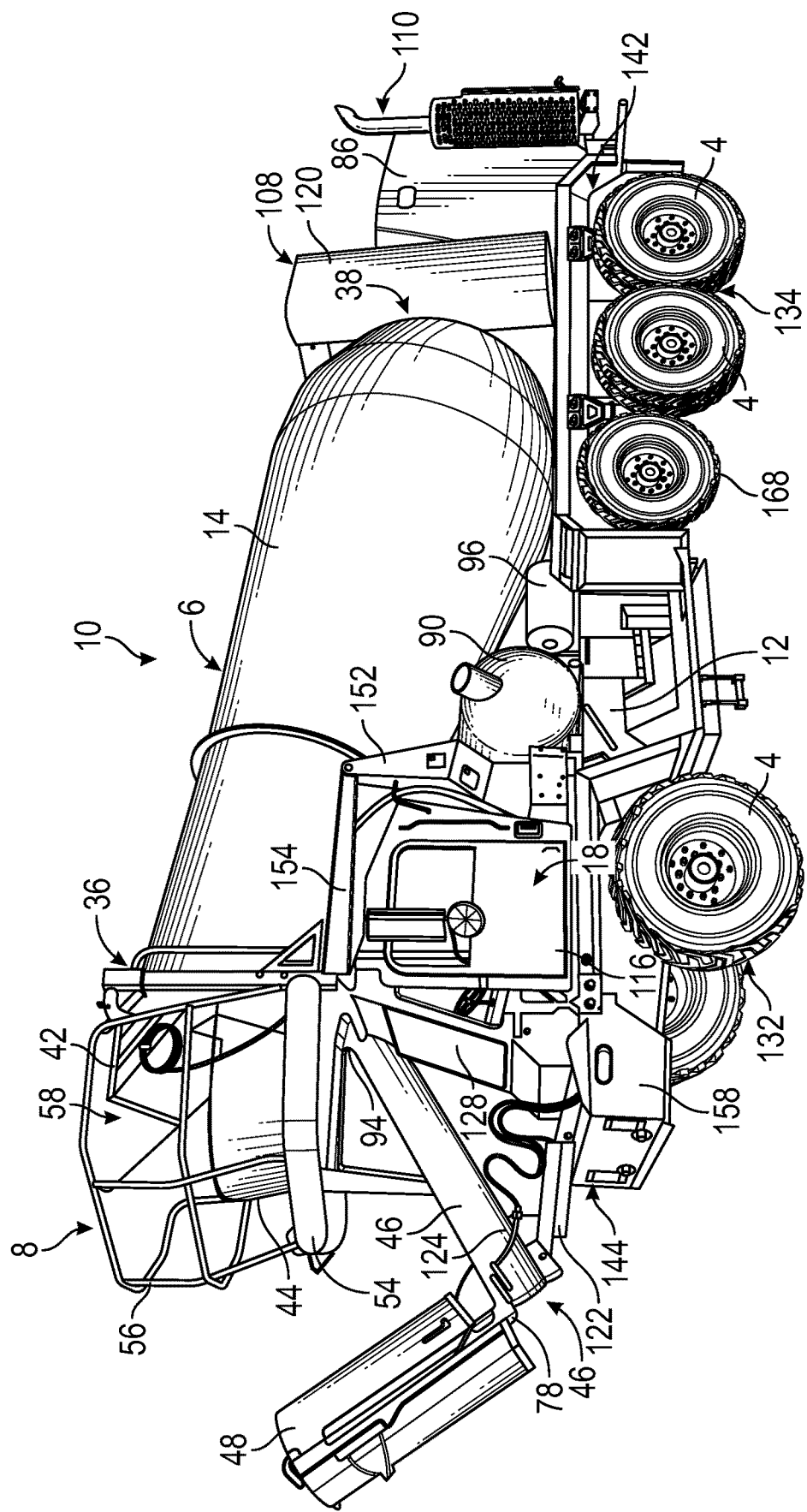
FIG. 2 is a front perspective view of the concrete mixer truck of FIG. 1, according to an exemplary embodiment.
Figure 3:
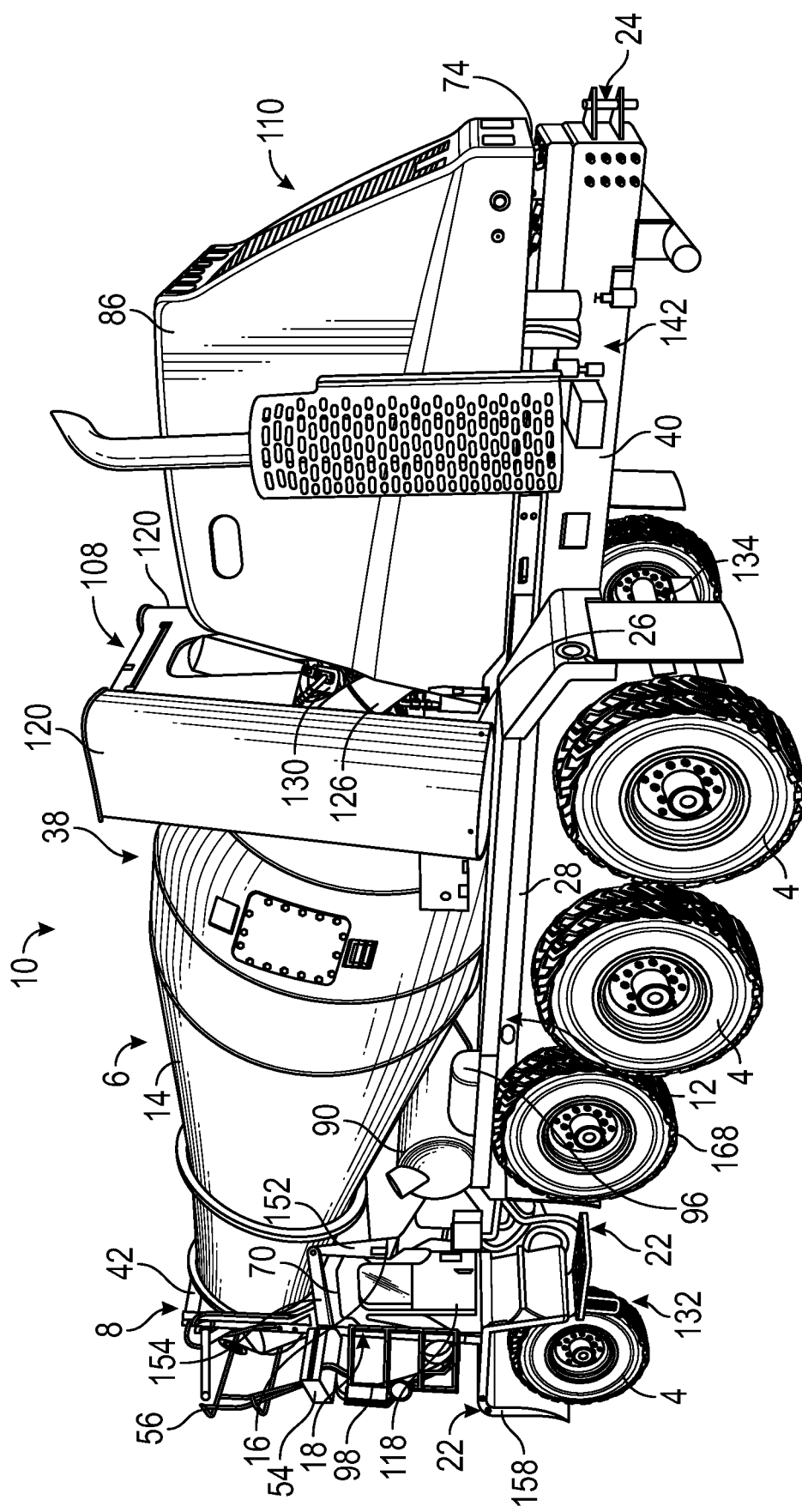
FIG. 3 is a rear perspective view of the concrete mixer truck of FIG. 1, according to an exemplary embodiment.

According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-3, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitates lifting along the chassis 12 such that the chassis 12 can be manipulated as a subassembly for assembly and/or maintenance of the concrete mixer truck 10. One or more components may be coupled to the chassis 12 using isolating mounts made of a complaint material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within 10 degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 40 may be disposed along a first lateral side 142 and a second frame rail 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of concrete mixer truck 10 and may be angled relative to the frame rails 40 (e.g., when viewed from the side of concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-3 is a front discharge concrete mixer vehicle, it is to be understood that in other embodiments the concrete mixer truck 10 may include a drum assembly 6 having any other discharge arrangement (e.g., rear discharge).

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of mixing drum 14 and the drum drive motor 130 extends rearward from drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuators (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44 such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48. The main chute 46 is selectively reconfigurable between a first configuration (e.g., a storage configuration, a transport configuration, etc.) and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscure the view of an operator positioned within the cab 18. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 is extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuators 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 122, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to at least one of rotate wheel and tire assemblies, to drive the transmission etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Rear Drive Pedestal

Figure 4:
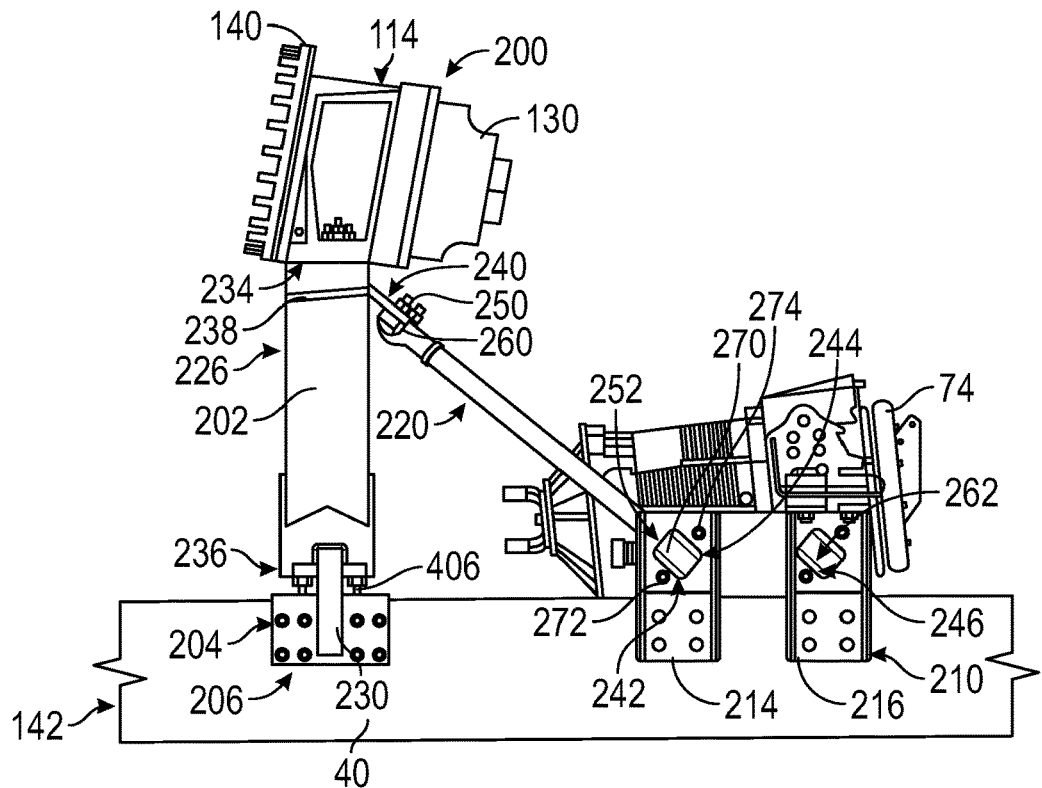
FIG. 4 is a side perspective view of a rear pedestal in a first installation configuration, according to an example embodiment.
Figure 6:
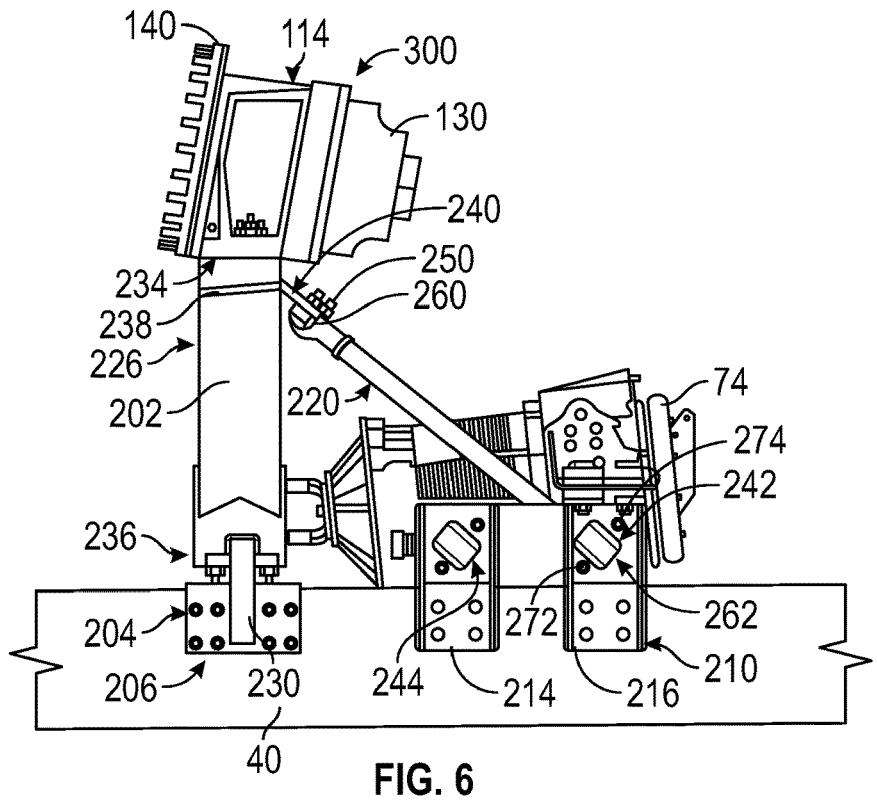
FIG. 6 is a side perspective view of a rear pedestal in a second installation configuration, according to an example embodiment.

Turning to FIG. 4, a perspective view of a rear drive pedestal 226 installed in a short drum configuration 200. The rear drive pedestal 226 is similar to the rear pedestal 26 of FIG. 1. A difference between the rear drive pedestal 226 and the rear pedestal 26, is the rear drive pedestal 226 implements a four-point mount. Accordingly, like numbering is used to designate similar components between the rear drive pedestal 226 and the rear pedestal 26. The rear drive pedestal 226 is configured to be fastened with bar-pin-bushings to a transmission mounting bracket assembly 210 that allow for several degrees of movement with the drum assembly 6. The rear drive pedestal 226 is configured to isolate the rear drive pedestal 226 from the frame 28 to reduce stress during articulation and other driving scenarios of the concrete mixer truck 10 by allowing the rear drive pedestal 226 to move independently of the frame 28. The transmission mounting bracket assembly 210 includes a first bracket 214 with a first bar-pin engagement surface 244 and a second bracket 216 with a second bar-pin engagement surface 246 on the first lateral side 142 and a third bracket 264 with a third bar-pin engagement surface 284 and a fourth bracket 266 with a fourth bar-pin engagement surface 276 on the second lateral side 144. The rear drive pedestal 226 may be bolted in a first installation position 252 (e.g., first bar-pin engagement surface 244 and third bar-pin engagement surface 284) to be in a short drum configuration 200. Alternatively, and as shown in FIG. 6, the rear drive pedestal 226 may be bolted at a second installation position 262 (e.g., second bar-pin engagement surface 246 and fourth bar-pin engagement surface 276) to be in a long drum configuration 300.

By implementing a four-point mount and mounting the rear drive pedestal 226 to the web of the frame 204, the rear drive pedestal 226 does not constrain a rigid pedestal to a flexible frame. Additionally, the interface joints 230 of the rear drive pedestal 226 allows for ease of service and distribution of wear to stronger portions of the frame 28. Accordingly, the rear drive pedestal 226 overcomes the deficiencies in conventional rear pedestals that are rigid and bolted to a flexible frame, such that it drives stress into the frame and other components that lead to structural and fastener (e.g., bolts, pins, etc.) failures. Beneficially, the rear drive pedestal 226 impedes or eliminates wear plates, frame stress, and poor distribution of load to the weaker portions of the frame 28. Thus, the rear drive pedestal 226 may reduce frequency of inspection and maintenance required for conventional rear pedestals.

The rear drive pedestal 226 includes a pedestal frame 202, a coupling brace 238, a first mounting bracket 206 on the first lateral side 142, a second mounting bracket 208 on the second lateral side 144, a first bar-pin member 220, and a second bar-pin member 222. The pedestal frame 202 has a first frame end 234 disposed toward a top of the pedestal frame 202, adjacent the drum driver 114, and a second frame end 236 disposed at the bottom of the pedestal frame 202, adjacent the frame 28. The pedestal frame 202 includes one or more webbed features or frame openings 370 (shown in FIG. 7) along the pedestal frame 202 between the first frame end 234 and second frame end 236. The frame openings 370 may be configured to further distribute stress through the rear drive pedestal 226 and eliminate wear on other components. The first frame end 234 is coupled to the drum drive motor 130 and/or the drum drive transmission 140. The second frame end 236 is coupled to a first interface joint 230 on the first lateral side 142 and the second interface joint 232 on the second lateral side 144.

Figure 5:
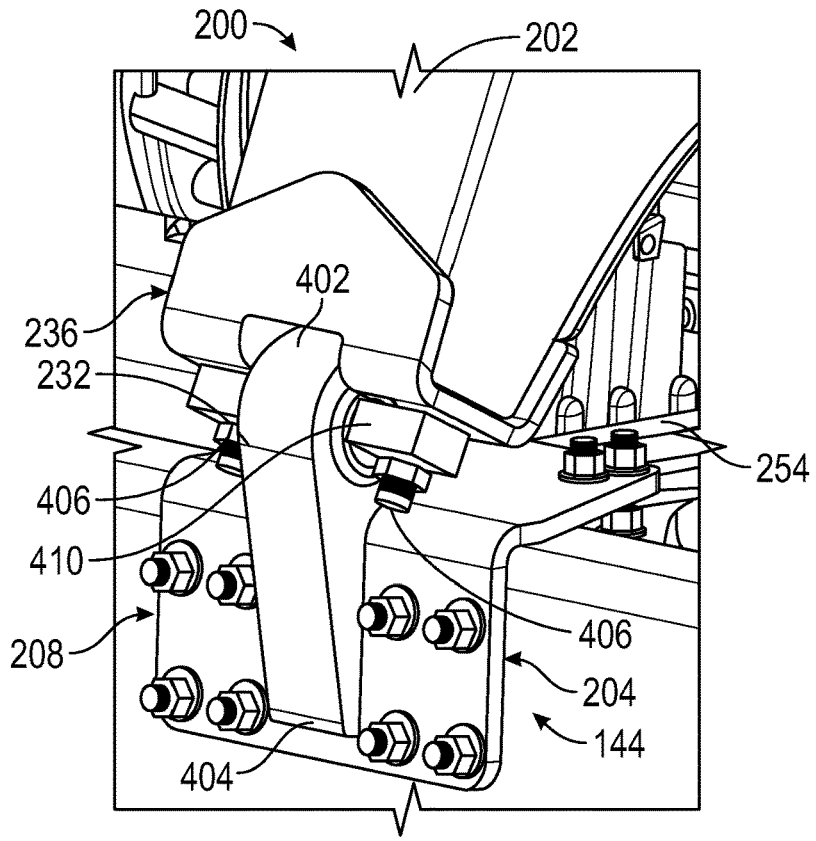
FIG. 5 is a perspective view of the interface joint of FIG. 4, according to an exemplary embodiment.

The first interface joint 230 and the second interface joint 232 are movable, flexible joints that are coupled to the first mounting bracket 206 and the second mounting bracket 208, respectively. As shown in FIG. 5, the second interface joint 232 includes a first joint end 402 toward the top portion of the second interface joint 232 near the second frame end 236 and a second joint end 404 toward the bottom portion of the second interface joint 232 and coupled to the second mounting bracket 208 on the second lateral side 144. A lateral support member 254 is coupled to an internal portion of the first mounting bracket 206 and an internal portion of the second mounting bracket 208. The lateral support member 254 is configured to support the engagement of the rear drive pedestal 226 and the frame 28 while providing flexibility to impede stress on other components of the concrete mixer truck 10.

The second joint end 404 is coupled to the second mounting bracket 208, which is coupled to the web of the frame 204, as opposed to conventional rear pedestals that are coupled to a top of a flange of the frame. In some embodiments, the second mounting bracket 208 is bolted to the web of the frame 204. The second joint end 404 of the second interface joint 232 is coupled to the first mounting bracket 206. In some embodiments, the second joint end 404 is molded with the second mounting bracket 208 to form a single unit. A coupling member 406 is disposed near the first joint end 402 and is configured to couple the second interface joint 232 with the second frame end 236 on the second lateral side 144. The coupling member 406 may include a flexible joint member 410 that allows flexibility and movement such that the second frame end 236 and the second interface joint 232 are not rigidly connected. Similarly, a coupling member 406 is disposed near the first joint end 402 of the first interface joint 230 and is configured to couple the first interface joint 230 with the second frame end 236 on the first lateral side 142. In other words, the connections and configurations of the first interface joint 230 and the second interface joint 232 are mirrored about the longitudinal axis of the frame 28.

The coupling brace 238 is disposed between the first frame end 234 and the second frame end 236 toward the first frame end 234. The coupling brace 238 is configured to receive a first bar-pin member 220 and a second bar-pin member 222 that are each coupled to a part of the transmission mounting bracket assembly 210. In other words, the coupling brace 238, through the first bar-pin member 220 and second bar-pin member 222, connects the rear drive pedestal 226 and the transmission mounting bracket assembly 210 to provide support and stress reduction/transfer for the rear drive pedestal 226 supporting the mixing drum 14.

The first bar-pin member 220 includes a first bar end 240 coupled to the coupling brace 238 and a second bar end 242 coupled to first bar-pin engagement surface 244 of the first bracket 214 of the transmission mounting bracket assembly 210. The first bar end 240 is coupled to the coupling brace 238 by a pin 250 (e.g., bolt with nut, threaded member, substantially straight coupler, etc.) through and opening on the first bar end 240 and the coupling brace 238. In some embodiments, a bushing 260 is disposed between the engagement of the coupling brace 238 and first bar end 240 (e.g., at the interface between two parts) damping the energy transmitted through the bushing 260. In some embodiments, a different vibration isolator is disposed between the engagement of the coupling brace 238 and first bar end 240 to dampen the noise and vibrations between the coupling brace 238 and first bar end 240. Similarly, the second bar-pin member 222 includes a first bar end 240 coupled to the coupling brace 238. As shown in FIGS. 4-7, the first bar-pin member 220 and the second bar-pin member 222 extend in opposite directions having the same degree offset from a central axis 700 (shown in FIG. 7) that runs longitudinally, with respect to the concrete mixer trucker 10, through the pedestal frame 202. This configuration is to properly distribute the load and stress of supporting the mixing drum 14 and other components supported by the rear drive pedestal 226.

As shown in FIG. 4, in the short drum configuration 200, the second bar end 242 of the is coupled to the first bar-pin engagement surface 244 disposed above the first bracket 214. The second bar end 242 and the first bar-pin engagement surface 244 are coupled by a flexible mount 270. The flexible mount 270 includes a first bolt-nut member 272 and a second bolt-nut member 274 configured to threadably engage corresponding holes in the first bar-pin engagement surface 244. The flexible mount 270 is configured to be flexible when mounted to the first bar-pin engagement surface 244 such that the engagement between the two components is not rigid. In some embodiments, the flexible mount 270 includes a bushing. In some embodiments, a bushing is disposed between the first bolt-nut member 272 and/or the second bolt-nut member 274 and the first bar-pin engagement surface 244. Similarly, the second bar-pin member 222 includes a second bar end 242 coupled to third bar-pin engagement surface 284 of the third bracket 264 of the transmission mounting bracket assembly 210 by the flexible mount 270.

The rear drive pedestal 226 is in the short drum configuration 200 when the coupling brace 238 is coupled to the transmission mounting bracket assembly 210 at the first installation position 252. Specifically, when the first bar-pin member 220 of the coupling brace 238 is coupled to the first bar-pin engagement surface 244 and the second bar-pin member 222 of the coupling brace 238 is coupled to the third bar-pin engagement surface 284. The bar-pin members 220, 222 with bushings connections between the pedestal frame 202 and the transmission mounting bracket assembly 210 and the interface joints 230, 232 between the mounting brackets 206, 208 on the web of the frame 204 and the pedestal frame 202 reduce stress through the components of the concrete mixer truck 10 and provide flexibility. Specifically, the connections between the mounting brackets 206, 208 on the web of the frame 204 and the pedestal frame 202 and between the pedestal frame 202 and the transmission mounting bracket assembly 210 allow for at least some relative movement between the frame rails 40, the engine 74, and the pedestal frame 202 within the system as the rear drive pedestal 226 is fastened, thereby allowing for several degrees of movement within the system and transmitting loads associated with operation of the concrete mixing truck 10 through the web of the frame versus onto the top frame flange.

Figure 7:
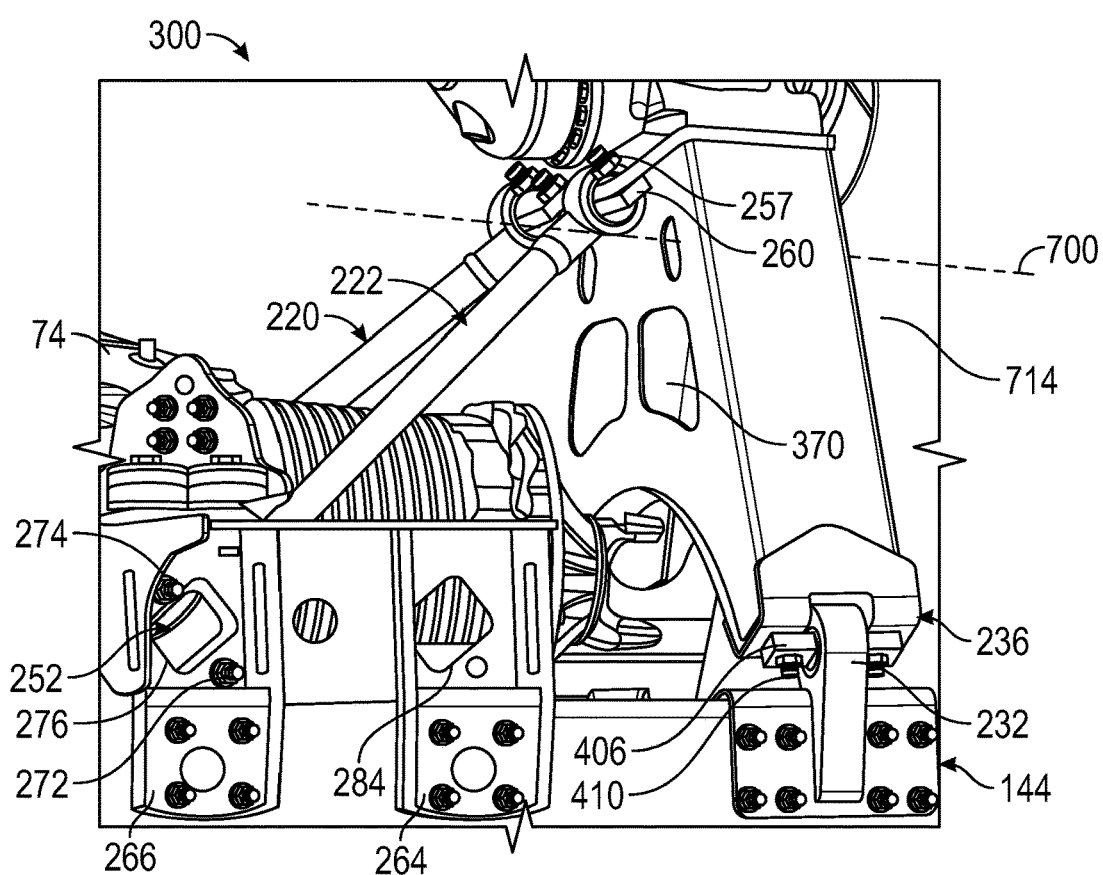
FIG. 7 is a rear perspective view of the rear pedestal in the second installation configuration of FIG. 6, according to an example embodiment.

Turning to FIGS. 6 and 7, perspective views of the rear drive pedestal 226 installed in a long drum configuration 300 is shown, according to an example embodiment. The rear drive pedestal 226 in the long drum configuration 300 is similar to the rear drive pedestal 226 in the short drum configuration 200 of FIGS. 4 and 5. A difference between the long drum configuration 300 and the short drum configuration 200 is that in the long drum configuration 300 the first bar-pin member 220 is coupled to the second bar-pin engagement surface 246 of the second bracket 216 on the first lateral side 142 and the second bar-pin member 222 is coupled to the fourth bar-pin engagement surface 276 of the fourth bracket 266 on the second lateral side 144. In other words, in the long drum configuration 300 the coupling brace 328 is coupled to the transmission mounting bracket assembly 210 in the second installation position 262. Accordingly, like numbering is used to designate similar components between the rear drive pedestal 226 installed in the long drum configuration 300 and the rear drive pedestal 226 installed in the short drum configuration 200.

As shown in FIG. 6, when in the long drum configuration 300, the first mounting bracket 206 on the first lateral side 142 and the second mounting bracket 208 on the second lateral side 144 are disposed further along the frame 28 in the direction of the rear end 24 and closer to the engine 74. The disposition of the rear drive pedestal 226 closer to the engine 74 is a result of the mixing drum 714 in the long drum configuration 300 being larger than the mixing drum 14. Because the first bar-pin member 220 and the second bar-pin member 222 have the same length as in the short drum configuration 200, the first bar-pin member 220 and the second bar-pin member 222 extend past the first bar-pin engagement surface 244 of the first bracket and the third bar-pin engagement surface 284 of the third bracket 264. Accordingly, the first bar-pin member 220 is coupled to the second bar-pin engagement surface 246 of the second bracket 216 and the second bar-pin member 222 is coupled to the fourth bar-pin engagement surface 276 of the fourth bracket 266 in a similar fashion as with the first bar-pin engagement surface 244 and the third bar-pin engagement surface 284 of the short drum configuration 200, respectively.

Front Roller Pedestal

Figure 8:
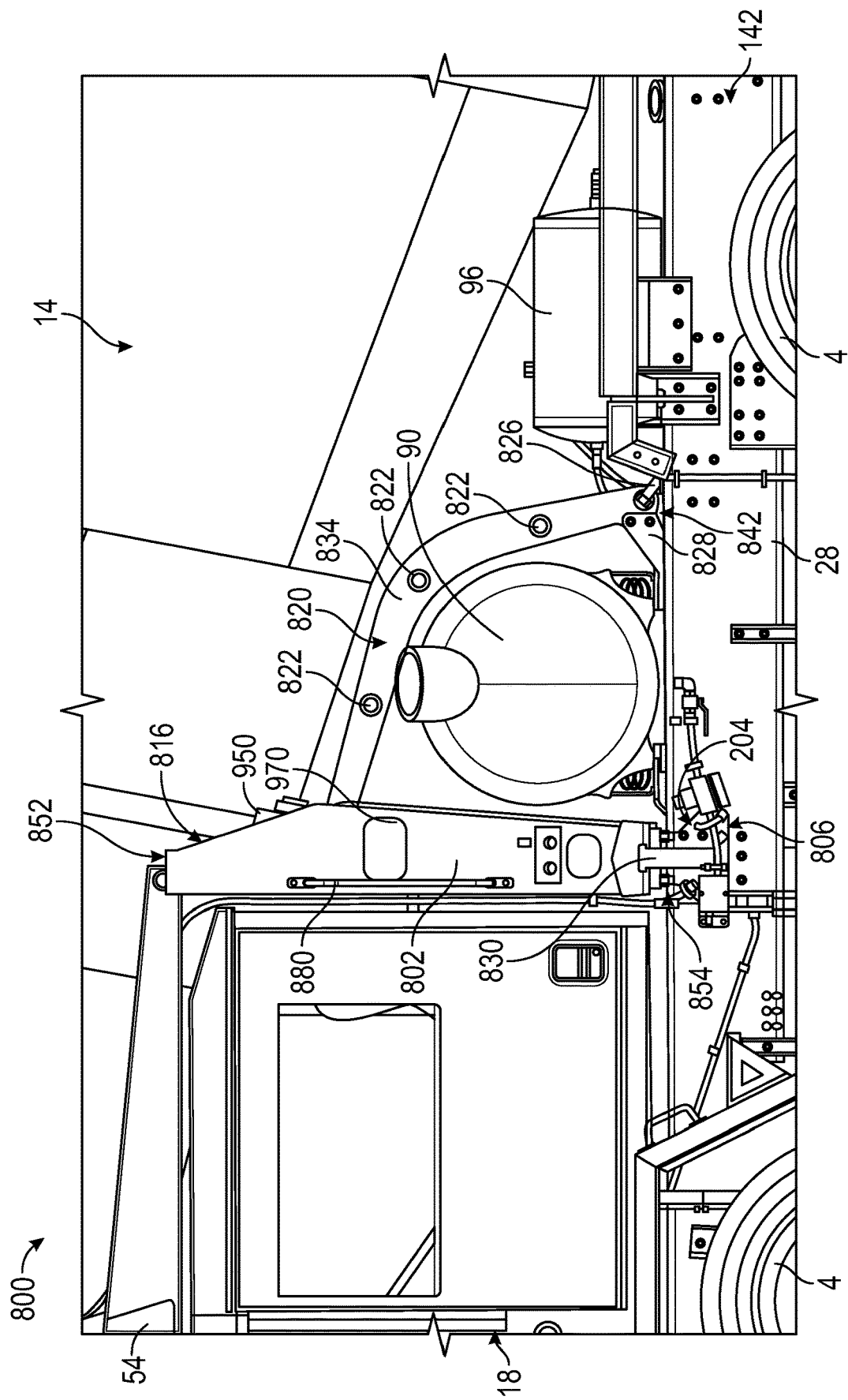
FIG. 8 is a side perspective view of a front pedestal with a curved bar, according to an example embodiment.
Figure 9:
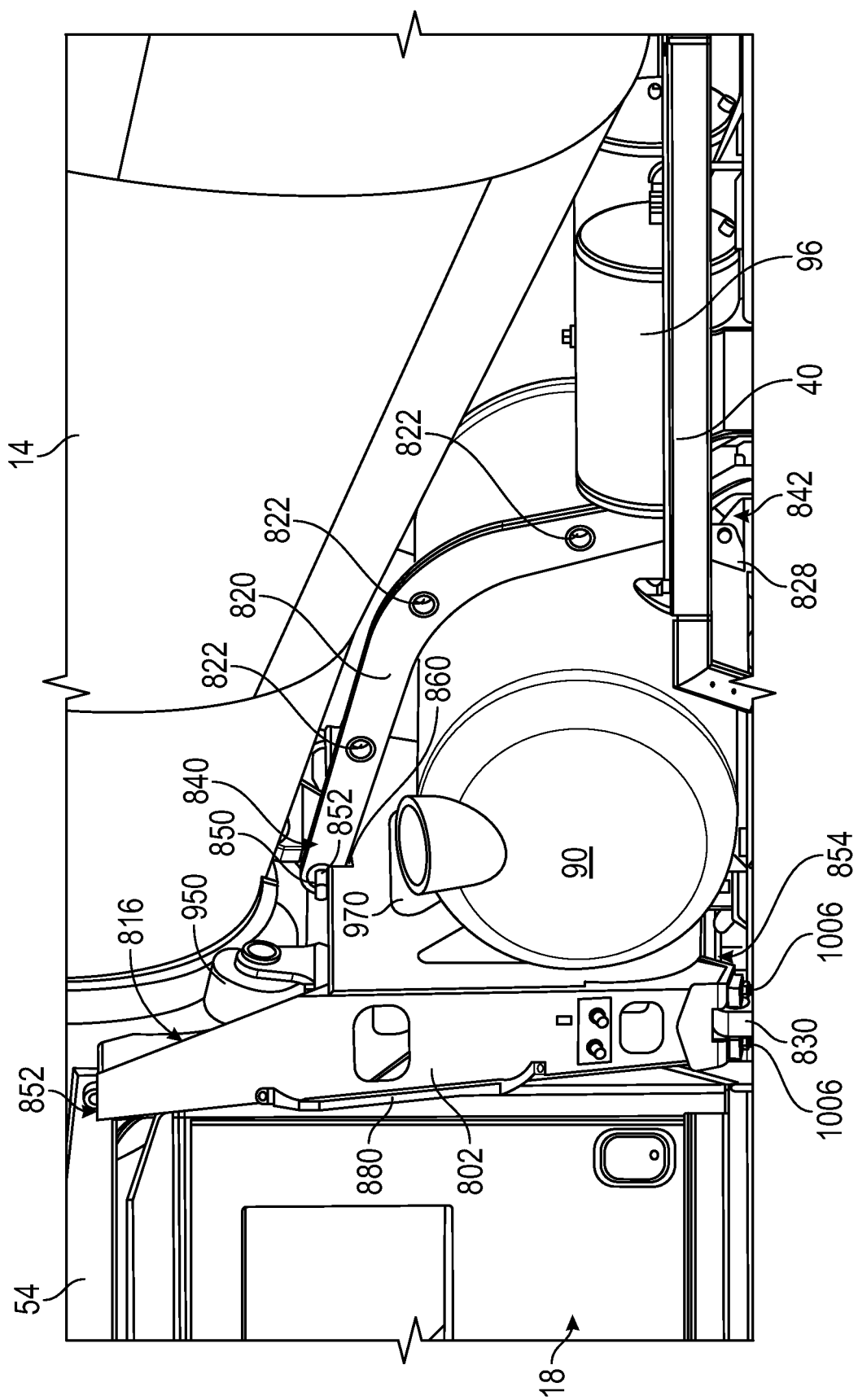
FIG. 9 is a rear perspective view of the rear pedestal in FIG. 8, according to an example embodiment.

Referring to FIGS. 8 and 9, perspective views of a front roller pedestal 816 with a curved support bar (e.g., frame) 834 installed in a concrete mixer truck 800 are shown, according to an example embodiment. The front roller pedestal 816 is similar to the front pedestal 16 of FIG. 1. A difference between the front roller pedestal 816 and the front pedestal 16, is the front roller pedestal 816 implements a three-point mount. The front roller pedestal 816 is configured to include a support member 820 from the pedestal frame 802 to provide longitudinal stability (i.e., in a longitudinal direction with respect to the longitudinal axis of the frame 28), thereby allowing the pedestal frame 802 to be narrower in design (e.g., in the longitudinal direction with respect to the longitudinal axis of the frame 28).

The three points of contact—the support member 820, a first mounting bracket 806 on the first lateral side 142, and a second mounting bracket 808 on the second lateral side 144—decreases the restriction within the mounting structure of the front roller pedestal 816 and drives less stress into the frame 28 and pedestal components compared to traditional configurations having four points of contact. Further, as will be described below, each of the three points of contact—the support member 820, the first mounting bracket 806, and the second mounting bracket 808—may include flexible coupling members thereby further allowing at least some relative movement between the frame 28 and the front roller pedestal 816, thereby allowing for several degrees of movement within the system and better dispersing transmitted loads associated with operation of the concrete mixing truck 10 into the web of the frame 204.

Beneficially, the curved support bar 834 extends over the water tank 90 and allows the front roller pedestal 816 to be much more narrow in design by providing longitudinal support to the front roller pedestal 816. Additionally, the pedestal frame 802 is coupled to the web of the frame 204, as opposed to conventional front pedestals that are coupled to a top of a flange of the frame. In some embodiments, one or more bushings may be implemented at engagement locations and/or joints to dampen the noise and vibrations between the components. Accordingly, the front roller pedestal 816 overcomes the deficiencies in conventional front pedestals that are rigid and bolted to a flexible frame, such that it drives stress into the frame and other components that lead to structural and fastener (e.g., bolts, pins, etc.) failures. Beneficially, the front roller pedestal 816 impedes or eliminates wear plates, frame stress, and poor distribution of load to the weaker portions of the frame 28. Thus, the front roller pedestal 816 may reduce frequency of inspection and maintenance required for conventional rear pedestals.

The front roller pedestal 816 includes a pedestal frame 802, a support slot 860, a first mounting bracket 806 on the first lateral side 142 (shown in FIG. 8), a second mounting bracket 808 on the second lateral side 144 (shown in FIG. 10), and a support member 820. The pedestal frame 802 has a frame upper portion 852 disposed toward a top of the pedestal frame 802, adjacent the platform 54 of the hopper assembly 8, and a lower portion 854 disposed at the bottom of the pedestal frame 802, adjacent the frame 28. The pedestal frame 802 includes one or more webbed features or frame openings 970 along the pedestal frame 802 between the frame upper portion 852 and frame lower portion 854. The frame openings 970 may be configured to further distribute stress through the front roller pedestal 816 and eliminate wear on other components. The frame upper portion 852 includes a pair of drum drive rollers 950 that are configured to receive and facilitate rolling of the mixing drum 14. The frame lower portion 854 is coupled to a first interface joint 830 on the first lateral side 142 and the second interface joint 832 on the second lateral side 144. A handle 880 may be disposed on the pedestal frame 802 on the first lateral side 142 to assist with an operator entering and exiting the cab 18.

Figure 10:
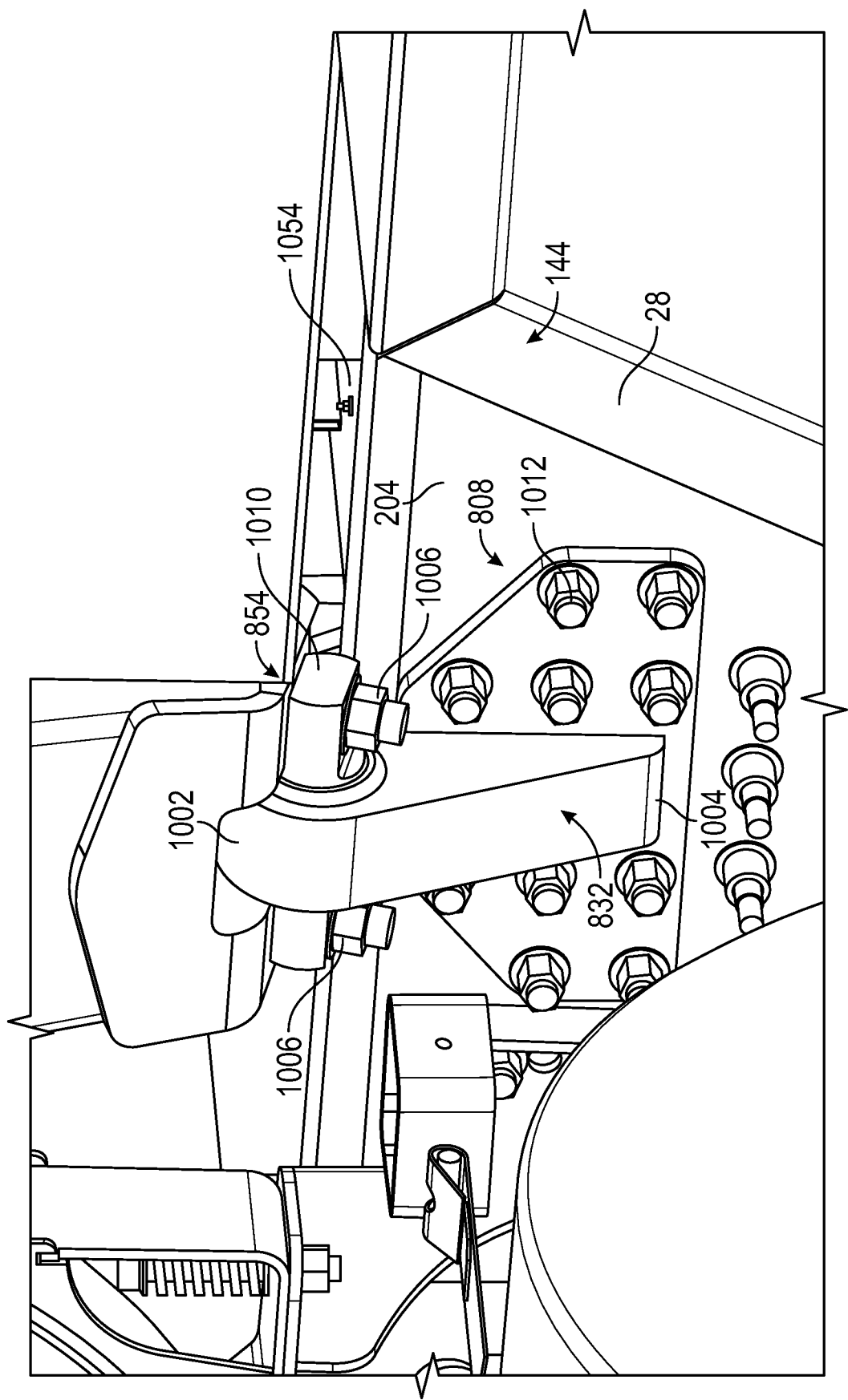
FIG. 10 is a perspective view of portion of the rear pedestal in FIG. 8, according to an example embodiment.

The first interface joint 830 and second interface joint 832 are movable, flexible joints that are coupled to the first mounting bracket 806 and the second mounting bracket 808, respectively. As shown in FIG. 10, the second interface joint 832 includes a first joint end 1002 toward the top portion of the second interface joint 832 near the frame lower portion 854 and a second joint end 1004 toward the bottom portion of the second interface joint 832 and coupled to the second mounting bracket 808 on the second lateral side 144. A lateral support member 1054 is coupled to an internal portion of the first mounting bracket 806 and an internal portion of the second mounting bracket 808. The lateral support member 1054 is configured to support the engagement of the front roller pedestal 816 and the frame 28 while providing flexibility to impede stress on other components of the concrete mixer truck 800.

The second joint end 1004 is coupled to the second mounting bracket 808, which is coupled to the web of the frame 204, as opposed to conventional front pedestals that are coupled to a top of a flange of the frame. As shown in FIG. 10, the second mounting bracket 808 is bolted to the web of the frame 204 using a plurality of fasteners 1012. As will be appreciated, the second joint end 804 of the second interface joint 832 is coupled to the second mounting bracket 808. In some embodiments, the second joint end 1004 is molded with the second mounting bracket 808 to form a single unit. A coupling member 1006 is disposed near the first joint end 1002 and is configured to couple the second interface joint 832 with the frame lower portion 854 on the second lateral side 144. The coupling member 1006 may include a flexible joint member 1010 that allows flexibility and movement such that the frame lower portion 854 and the second interface joint 832 are not rigidly connected. Similarly, a coupling member 1006 is disposed near the first joint end 1002 of the first interface joint 830 and is configured to couple the first interface joint 830 with the frame lower portion 854 on the first lateral side 142. In other words, the connections and configurations of the first interface joint 830 and the second interface joint 832 are mirrored about the longitudinal axis of the frame 28.

The support slot 860 is disposed between the frame upper portion 852 and the frame lower portion 854 toward the frame upper portion 852. The support slot 860 is configured to receive a first support end 840 of the support member 820. In other words, the support slot 860, through the support member 820, connects the pedestal frame 802 with a third contact point that provides longitudinal stability. The support slot 860 is coupled to the first support end 840 by a joint member 858 that extends laterally through the first support end 840 and includes a first engagement member 850 and a second engagement member 856 on each end of the joint member 858 that couples the joint member to the pedestal frame 802. The first engagement member 850 and the second engagement member 856 may be a bolt with a nut, a threaded member, a substantially straight coupler, or a similar fastening member.

The support member 820 includes the first support end 840, which is coupled to the support slot 860, and a curved support bar 834 extending between the first support end 840 and the second support end 842. The curved support bar 834 is configured to provide longitudinal stability to the front roller pedestal 816 while having a shape that extends over and provides clearance for (e.g., does not interfere with) the water tank 90 disposed behind the cab 18 of the concrete mixer truck 800. The curved support bar 834 may include a plurality of openings 822 along the body of the curved support bar 834 to provide additional stress reduction or structural support throughout the curved support bar 834.

As shown in FIG. 9, the second support end 842 is coupled to the frame 28, on a side adjacent the water tank, with a first support joint 828. The first support joint 828 may be flexible, while still providing additional longitudinal stability to the front roller pedestal 816. A second support joint 826 couples the second support end 842 with an interior portion of the frame 28, on a side adjacent the air tank 96 (e.g., toward the rear end 24). The downwardly angled second support joint 826 may be flexible in the longitudinal direction to provide additional longitudinal stability to the front roller pedestal 816. In some embodiments, the second support joint 826 is a dampener that is configured to dampen a longitudinal force toward the rear end 24 or a piston that is configured to provide a counteracting longitudinal force toward the front end 22. In some embodiments, one or both of the first support joint 828 or second support joint 826 may implement one or more bushings or a vibration isolator to dampen the noise and vibrations between the support member 820 and the frame 28.

Figure 12:
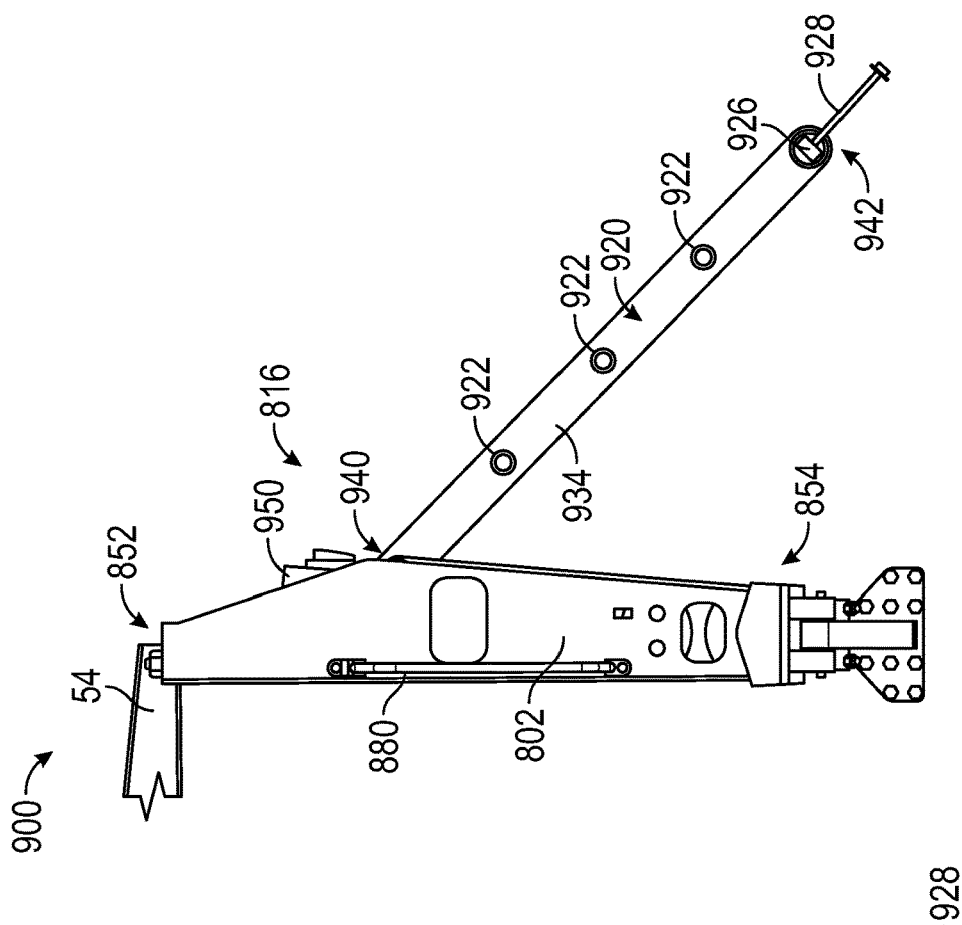
FIG. 12 is a side perspective view of the rear pedestal in FIG. 11, according to an example embodiment.
Figure 11:
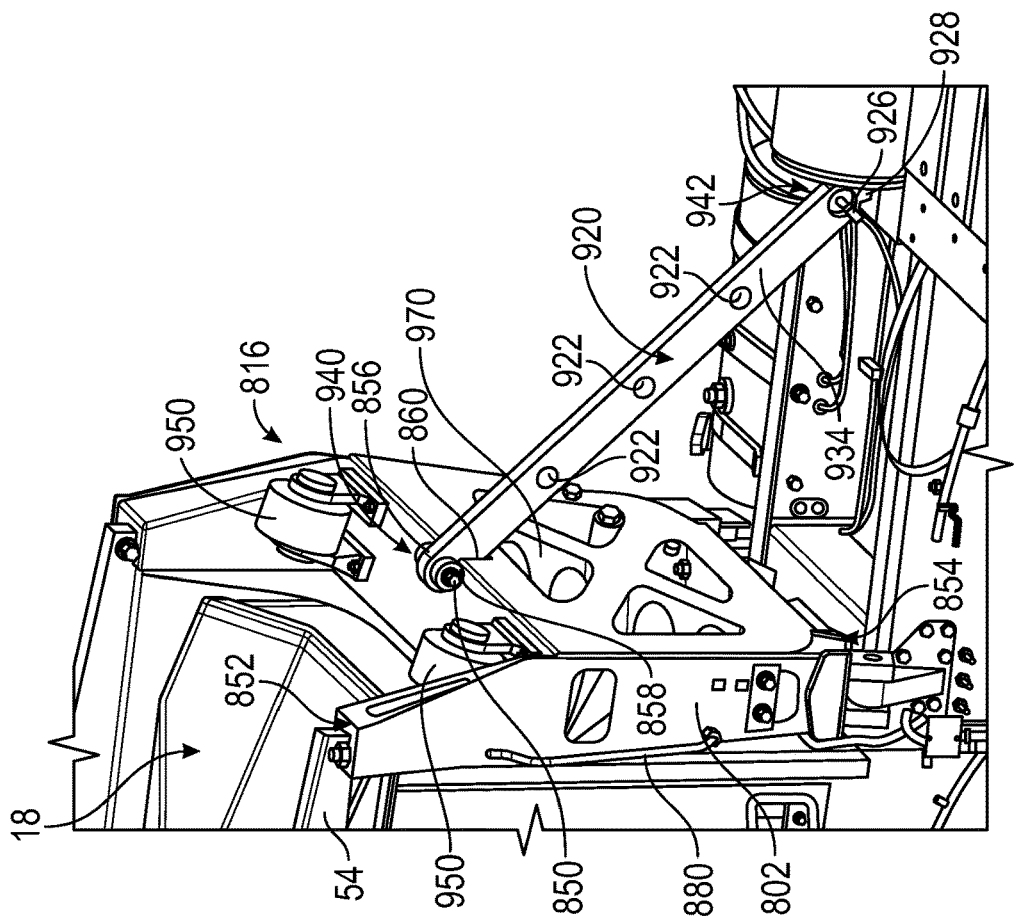
FIG. 11 is a rear perspective view of a front pedestal with a straight, according to an example embodiment.

Turning to FIGS. 11 and 12, perspective views of a front roller pedestal 816 with a straight support bar 934 installed in a concrete mixer truck 900 are shown, according to an example embodiment. The front roller pedestal 816 with the straight support bar 934 is similar to the front roller pedestal 816 with the curved support bar 834 of FIGS. 8-10. A difference between the front roller pedestal 816 with the curved support bar 834 and the front roller pedestal 816 with the straight support bar 934, is the straight support bar 934 is substantially straight, forming an approximately 45-degree angle with the frame 28. Accordingly, like numbering is used to designate similar components between front roller pedestal 816 with the straight support bar 934 and the front roller pedestal 816 with the straight support bar 934.

As shown in FIGS. 11 and 12, the support slot 860 is disposed between the frame upper portion 852 and the frame lower portion 854 toward the frame upper portion 852. The support slot 860 is configured to receive a first support end 940 of the support member 920. In other words, the support slot 860, through the support member 920, connects the pedestal frame 802 with a third contact point that provides longitudinal stability. The support slot 860 is coupled to the first support end 940 by a joint member 858 that extends laterally through the first support end 940 and includes a first engagement member 850 and a second engagement member 856 on each end of the joint member 858 that couples the joint member to the pedestal frame 802. The first engagement member 850 and the second engagement member 856 may be a bolt with a nut, a threaded member, a substantially straight coupler, or a similar fastening member.

The support member 920 includes the first support end 940, which is coupled to the support slot 860, and a straight support bar 934 extending between the first support end 940 and the second support end 942. The straight support bar 934 is configured to provide longitudinal stability to the front roller pedestal 816 while having a shape that extends over (e.g., does not interfere with) the water tank 90 disposed behind the cab 18 of the concrete mixer truck 800. The water tank 90 may be disposed closer to the cab 18 in order to fit under the straight support bar 934. The straight support bar 934 may include a plurality of openings 922 along the body of the straight support bar 934 to provide additional stress reduction or structural support throughout the straight support bar 934.

As shown in FIGS. 11 and 12, the second support end 942 is coupled to the frame 28 with a support joint 926. The support joint 926 couples the second support end 942 with an interior portion of the frame 28 by way of an extending member 928, on a side toward the rear end 24. The downwardly support joint 926 may be rotatable and flexible in the longitudinal direction to provide additional longitudinal stability to the front roller pedestal 816. In some embodiments, the support joint 926 is a dampener that is configured to dampen a longitudinal force toward the rear end 24 or a piston that is configured to provide a counteracting longitudinal force toward the front end 22. In some embodiments, the support joint 926 implements bushings or a vibration isolator to dampen the noise and vibrations between the support member 920 and the frame 28.

Chute Motor

Figure 13:
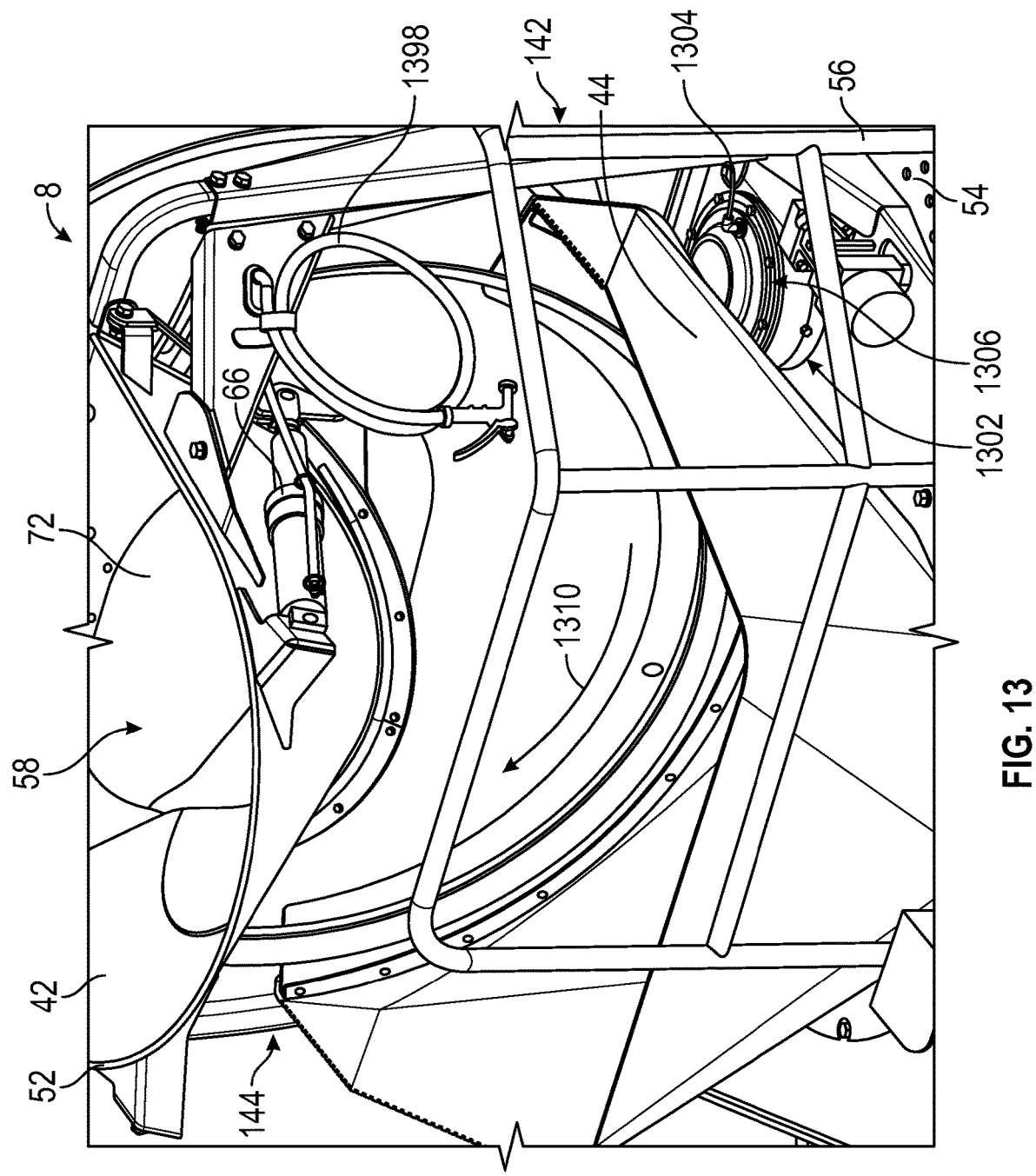
FIG. 13 is a perspective view of a concrete mixer truck with a chute motor, according to an example embodiment.

Referring to FIG. 13, a chute motor 1302 and gear assembly 1306 positioned on the first lateral side 142 is shown, according to an example embodiment. The chute motor 1302 and gear assembly 1306 are configured to drive a second chute actuator 94 that is coupled to the base section 124 of the main chute 46 and the platform 54. The chute motor 1302 is configured to drive the gear assembly 1306 to rotate the main chute 46 about the vertical axis. The term gear assembly 1306, as used herein, is used to describe a series of gears, a motor wheel (e.g., a sprocket, a cogged wheel, a grooved wheel, a smooth-sided wheel, etc.), an output shaft, an electrical conduit, a hydraulic fluid conduit, belt, or similar member to transfer rotational motion generated by the chute motor 1302. In some embodiments, the chute motor is configured to move the distal end of the main chute 46 through an arc along the left, front, and right sides of the chassis 12 (e.g., a 150 degree arc, a 180 degree arc, a 210 degree arc, etc.). While the chute motor 1302 is described in relation to driving the second chute actuator 94, in some embodiments, the chute motor 1302 may be configured to control the hopper actuator 66 to move the charge hopper 42 between the raised and lowered positions.

Figure 14:
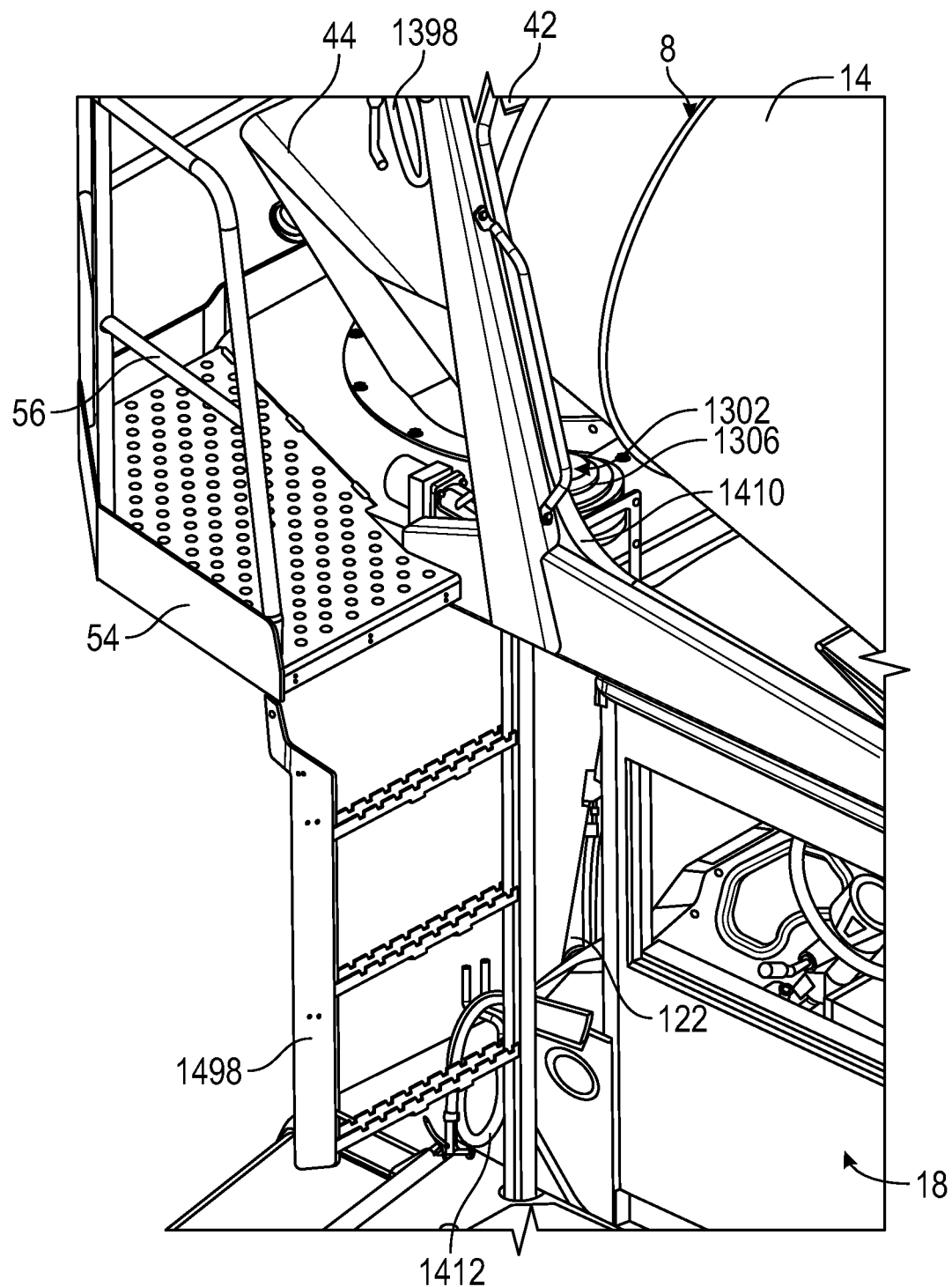
FIG. 14 is a rear perspective view of the chute motor of the concrete mixer truck of FIG. 13, according to an example embodiment.
Figure 15:
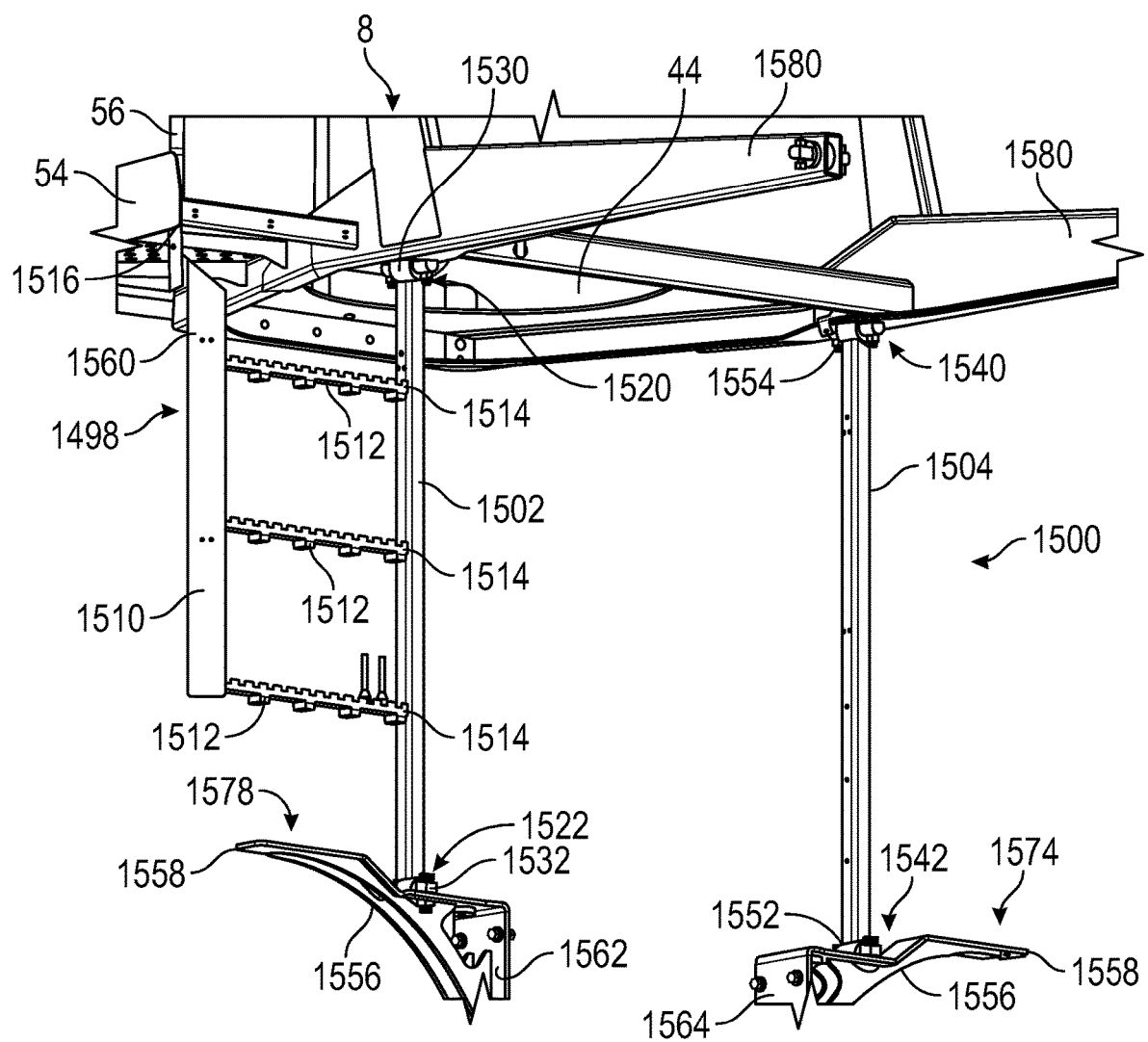
FIG. 15 is a rear perspective view of a superstructure, according to an example embodiment, according to an example embodiment.

As shown in FIGS. 1 and 13, when the mixing drum 14 is driven by the drum driver 114 in the clockwise direction 1310 the contents of a mixture located within an internal volume 30 of the mixing drum 14 are discharged. While the concrete is being discharged, the concrete flows through the main chute 46 and movement of the concrete mixer truck 10 during the discharge may agitate the flow and cause the concrete to spill over the right side, the second lateral side 144, of the hopper assembly 8. By positioning the chute motor 1302 on the left side, the first lateral side 142, of the hopper assembly 8 and underneath the mixing drum 14, the chute motor 1302 is avoids receiving concrete build up that could impede operation of the chute motor 1302 and, in turn, the second chute actuator 94. In addition to avoiding concrete spillover, by positioning the chute motor 1302 adjacent to the platform 54 and ladder 1498 as shown in FIG. 14, an operator can easily access the chute motor 1302 from the ladder 1498 and/or platform 54 and can use the hose 1398 to clean off the chute motor 1302 from concrete debris. Additionally, a cab hose 1412 may be used to clean the chute motor 1302. The hose 1398 and cab hose 1412 may be fluidly connected to a water tank 90.

In some embodiments, the chute motor 1302 is a hydraulic motor that is fluidly coupled to a pump by a conduit 1304. The pump may be configured to pump fluid (e.g., hydraulic fluid, etc.) stored within the fluid reservoir to drive the chute motor 1302. In some embodiments, the pump is configured to use mechanical energy supplied by the engine 74 and provide a flow of pressurized hydraulic fluid to the chute motor 1302. The hydraulic pump may be directly coupled to the engine 74 (e.g., coupled to a crank shaft of the engine 74 or an output shaft of the engine 74, etc.). Alternatively, the hydraulic pump may be indirectly coupled to the engine 74 through one or more power transmission devices (e.g., the transmission, a serpentine belt assembly, a geared connection, a power take-off, etc.). The pump may be a variable displacement hydraulic pump (e.g., an axial piston pump, etc.) and has a pump stroke that is variable. The pump may be configured to provide hydraulic fluid at a flow rate that varies based on the pump stroke (e.g., the greater the pump stroke, the greater the flow rate provided to the chute motor 1302, etc.). The pressure of the hydraulic fluid provided by the pump may also increase in response to an increase in pump stroke (e.g., where pressure may be directly related to work load, higher flow may result in higher pressure, etc.). The pressure of the hydraulic fluid provided by the pump may alternatively not increase in response to an increase in pump stroke (e.g., in instances where there is little or no work load, etc.). The pump may include a throttling element (e.g., a swash plate, etc.). The pump stroke of the pump may vary based on the orientation of the throttling element. In one embodiment, the pump stroke of the pump varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases.

In those embodiments, the outlet of the hydraulic pump is fluidly coupled (e.g., indirectly or indirectly) to the chute motor 1302 via the conduit 1304. Accordingly, the flow of pressurized hydraulic fluid from the hydraulic pump drives the chute motor 1302. After exiting the chute motor 1302, the hydraulic fluid returns to the tank. In some embodiments, the gear assembly 1306 is an output shaft of the chute motor 1302 that is coupled to the second chute actuator 94 (either directly or indirectly). In other embodiments, the gear assembly 1306 is a plurality of gears (e.g., a planetary gear reduction set, etc.) configured to rotate the main chute 46 by way of rotating (e.g., torque applied to) the second chute actuator 94. The plurality of gears of the gear assembly 1306 may be disposed within a housing adjacent the chute motor 1302. In some embodiments, the chute motor 1302 may be an electric motor, an internal combustion engine, or another suitable mechanical power source. In embodiments where the chute motor 1302 is an internal combustion engine, a fluid reservoir may be configured to store liquid and/or gaseous fuel (e.g., gasoline, diesel, propane, natural gas, hydrogen, etc.) and the pump may be configured as a fuel pump. In still other embodiments, the chute motor 1302 is or includes an electric motor. In such embodiments, the fluid reservoir may be an energy storage device (e.g., a battery, a capacitor, etc.) configured to store and provide chemical and/or electrical energy though electrical conduits 1410 to the chute motor 1302. The chute motor 1302 may not include the pump in such embodiments.

Visibility Superstructure

Referring to FIGS. 15-18, a superstructure 1500 that includes a first pillar 1502, a second pillar 1504, and an operator ladder 1498 that improves driver visibility, increases driver perspective, and minimizes blind spots is described, according to an example embodiment. The operator ladder 1498 may include a ladder rail 1510 that couples to the ladder rungs 1512 at an angle, such that the ladder rail 1510 extends in a direction that is parallel to the driver's sight line when operating the concrete mixer truck 10 in the cab 18, thereby minimizing a blind spot caused by the ladder rail 1510. Beneficially, the superstructure 1500 components improve visibility and operability for when the operator is pouring concrete and controlling the hopper assembly 8 and the main chute 46. The superstructure 1500, including the pillars 1502, 1504, the ladder rail 1510, and the ladder rungs 1512 have been located to minimize view obstruction from the perspective of an operator inside the cab 18.

The superstructure 1500 includes the platform 54, a pair of support arms 1580 configured to couple to the front pedestal 16, a first pillar 1502, a second pillar 1504, and a ladder 1498. Each of the first pillar 1502, the second pillar 1504, and the ladder 1498 are configured to minimize view obstruction for the operator driving the concrete mixer truck 10. The first pillar 1502 includes a first pillar top 1520 and a first pillar bottom 1522 spaced axially away from the first pillar top 1520. The first pillar top 1520 includes a first bar-pin coupling member 1530 or torque rod end to couple the first pillar 1502 to a bottom portion of the platform 54, adjacent an end of the mouth of the discharge hopper 44. Similarly, the first pillar bottom 1522 includes a second bar-pin coupling member 1532 or torque rod end to couple the first pillar 1502 to a first chassis support member 1578. The first chassis support member 1578 includes a chassis coupling surface 1562 and a support arm 1558 that extends laterally away from the chassis coupling surface 1562. The support arm 1558 forms a wheel accommodating portion 1556.

Each of the first bar-pin coupling member 1530 and the second bar-pin coupling member 1532 are configured such that the joints are flexible (e.g., movable) and able to articulate without driving stress into other components of the superstructure 1500 and/or concrete mixer truck 10. In some embodiments, one or more bushings may be implemented with the first bar-pin coupling member 1530 and the second bar-pin coupling member 1532 to keep the joints from wearing, vibrating, or making noise that may distract or annoy the operators. The bushings and the first bar-pin coupling member 1530 and the second bar-pin coupling member 1532 are described in greater detail below in FIGS. 20-22.

Figure 18A:
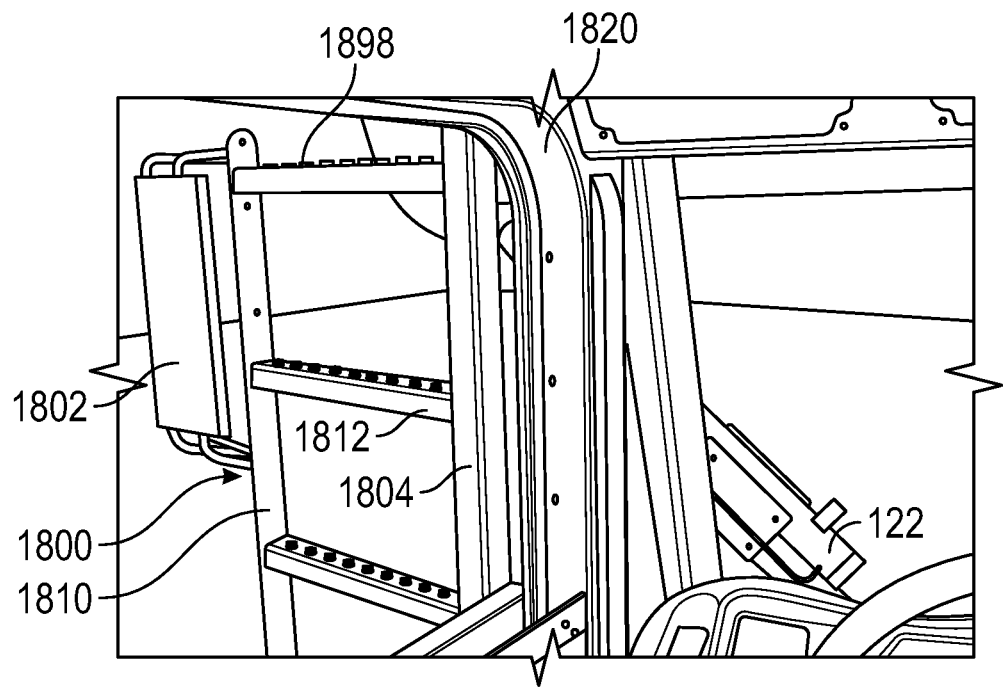
FIG. 18A is a perspective view of a conventional superstructure from the perspective of a driver, according to an example embodiment.
Figure 18B:
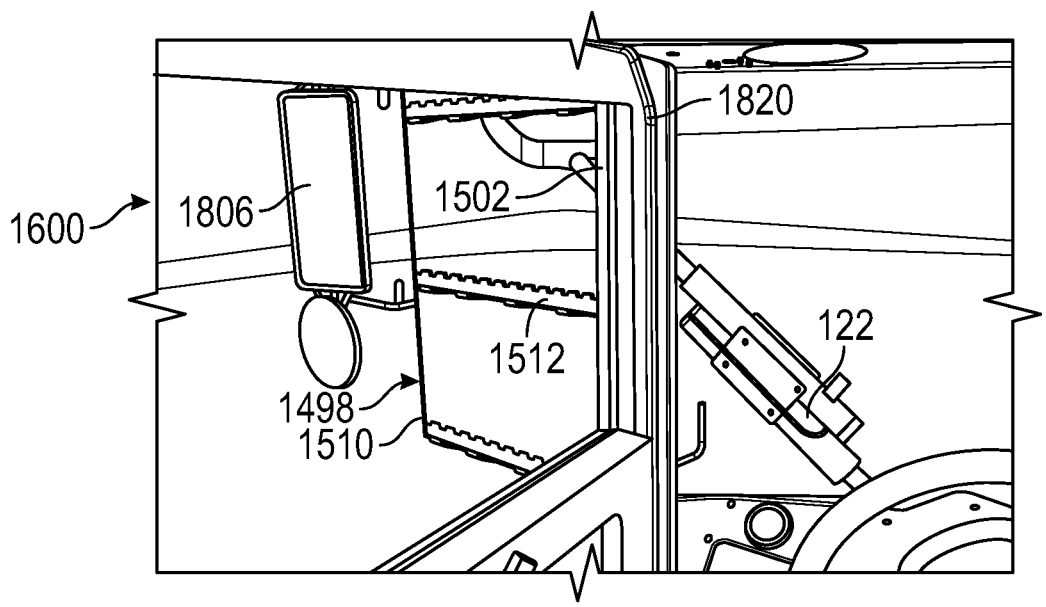
FIG. 18B is a perspective view of the superstructure of FIG. 16 from the perspective of a driver, according to an example embodiment.

The first pillar 1502 includes the ladder 1498 configured to be positioned behind an a-pillar 1820 of the cab 18 to increase operator visibility and minimize obstruction of view (shown in FIG. 18B). The ladder 1498 includes a ladder rail 1510 parallel to the first pillar 1502 and extending from the platform 54 axially downward. The ladder rail 1510 is coupled to the platform 54 by a coupling plate 1516. The distal end of the ladder rail 1510 is free-standing (e.g., not connected to another component). A plurality of rungs 1512 extend from the ladder rail 1510 laterally toward the first pillar 1502. The plurality of rungs 1512 are a series of structural members or steps that are flat or tubular members each having a rectangular or round cross section, respectively. Each rung in the plurality of rungs 1512 is coupled to a portion 1514 of the first pillar 1502. In some embodiments, the plurality of rungs 1512 are welded to the first pillar 1502 and the ladder rail 1510. In other embodiments, the plurality of rungs are coupled to the first pillar 1502 and the ladder rail 1510. In some embodiments, the coupling plate 1516 and plurality of rungs 1512 are angled such that the plurality of rungs 1512 are parallel to the operator's sight line when positioned in the cab 18. As shown in FIG. 18B, the first pillar top 1520 is positioned behind an a-pillar 1820 of the cab 18 to provide improved visibility compared to a conventional superstructure 1800 with a conventional ladder rail 1810 and first pillar 1804, as shown in FIG. 18A.

The second pillar 1504 includes a second pillar top 1540 and a second pillar bottom 1542 spaced axially away from the second pillar top 1540. The second pillar top 1540 includes a third bar-pin coupling member 1554 or torque rod end to couple the second pillar 1504 to a bottom portion of the platform 54, adjacent an end of the mouth of the discharge hopper 44. Similarly, the second pillar bottom 1542 includes a fourth bar-pin coupling member 1552 or torque rod end to couple the second pillar 1504 to a second chassis support member 1574. The second chassis support member 1574 includes a chassis coupling surface 1564 and a support arm 1558 that extends laterally away from the chassis coupling surface 1564. The support arm 1558 forms a wheel accommodating portion 1556.

Figure 20:
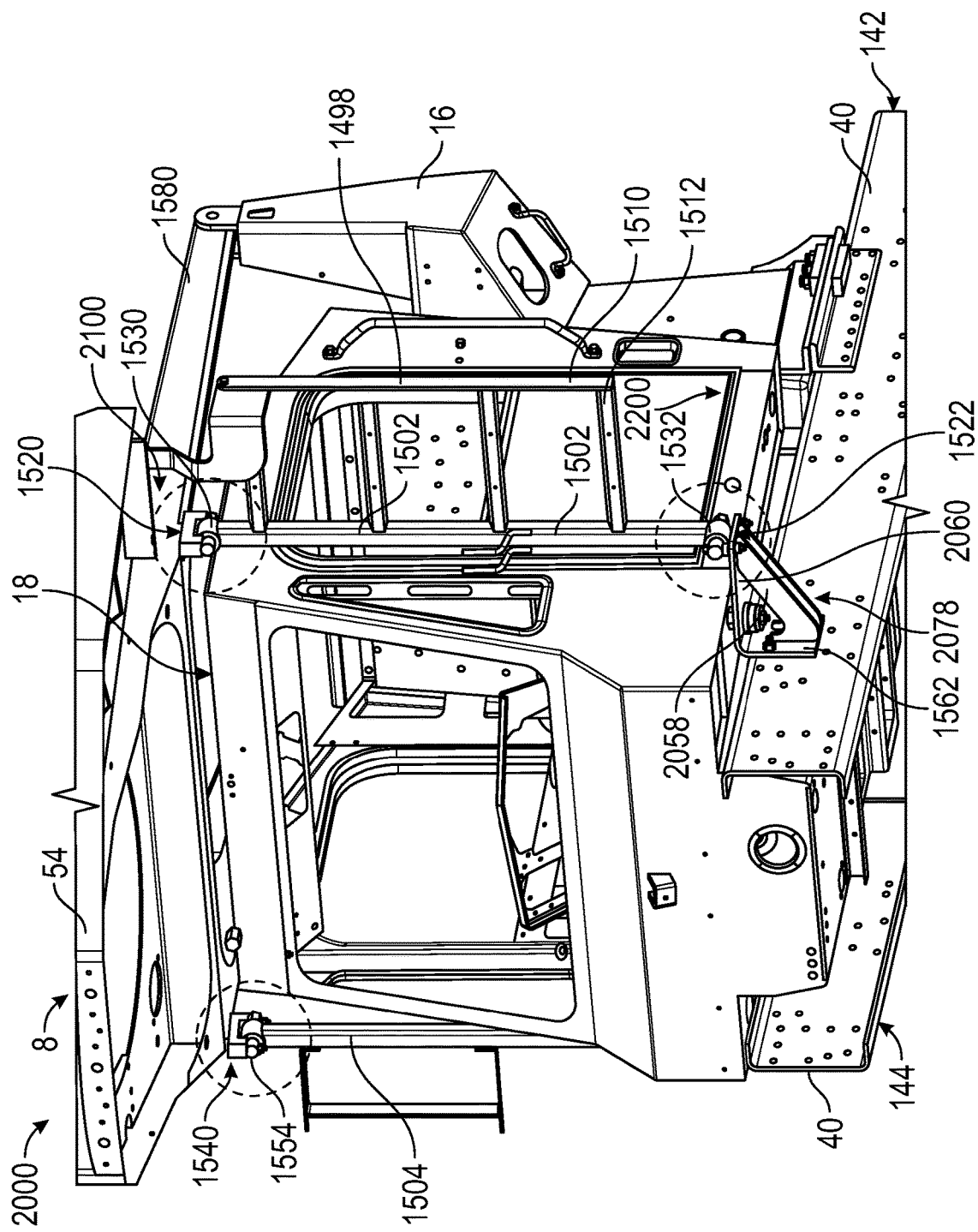
FIG. 20 is a perspective view of a superstructure, according to an example embodiment.

Each of the third bar-pin coupling member 1554 and the fourth bar-pin coupling member 1552 are configured such that the joints are flexible (e.g., movable) and able to articulate without driving stress into other components of the superstructure 1500 and/or concrete mixer truck 10. In some embodiments, one or more bushings may be implemented with the third bar-pin coupling member 1554 and the fourth bar-pin coupling member 1552 to keep the joints from wearing, vibrating, or making noise that may distract or annoy the operators. The bushings and the third bar-pin coupling member 1554 and the fourth bar-pin coupling member 1552 are described in greater detail below in FIGS. 20-22. As best illustrated in FIG. 20, the second pillar top 1540 is similarly positioned behind an a-pillar of the cab 18 to provide improved visibility compared to a conventional superstructure 1800 with a conventional second pillar.

Figure 17:
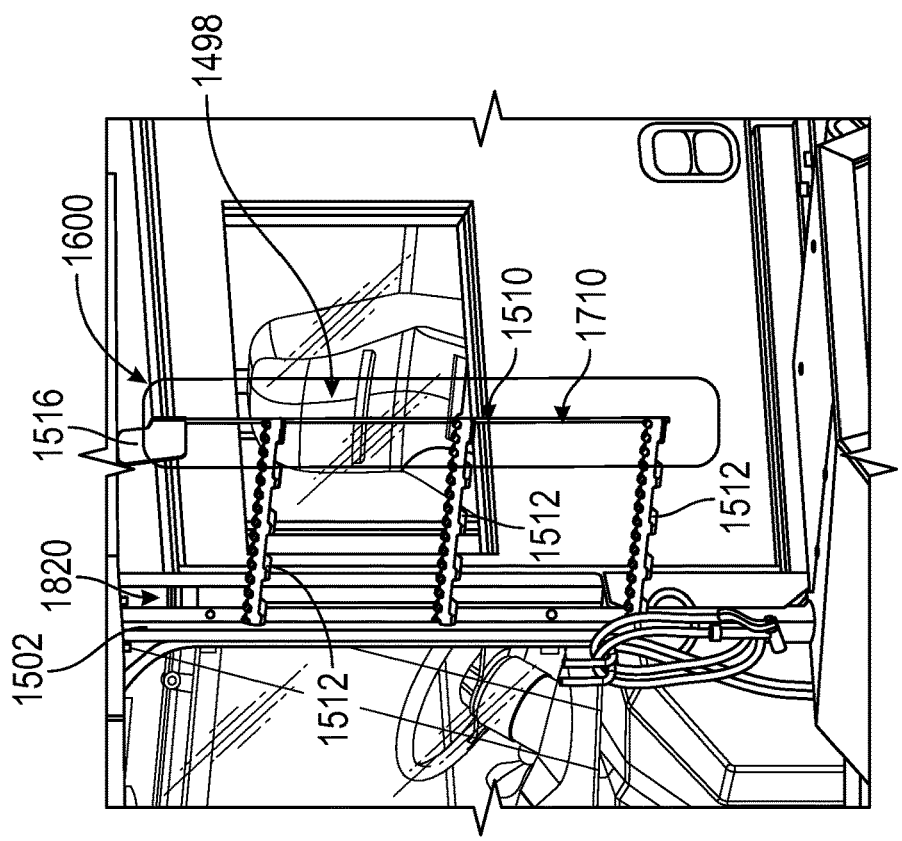
FIG. 17 is front, side perspective view of the portion of the superstructure of FIG. 16, according to an example embodiment.
Figure 16:
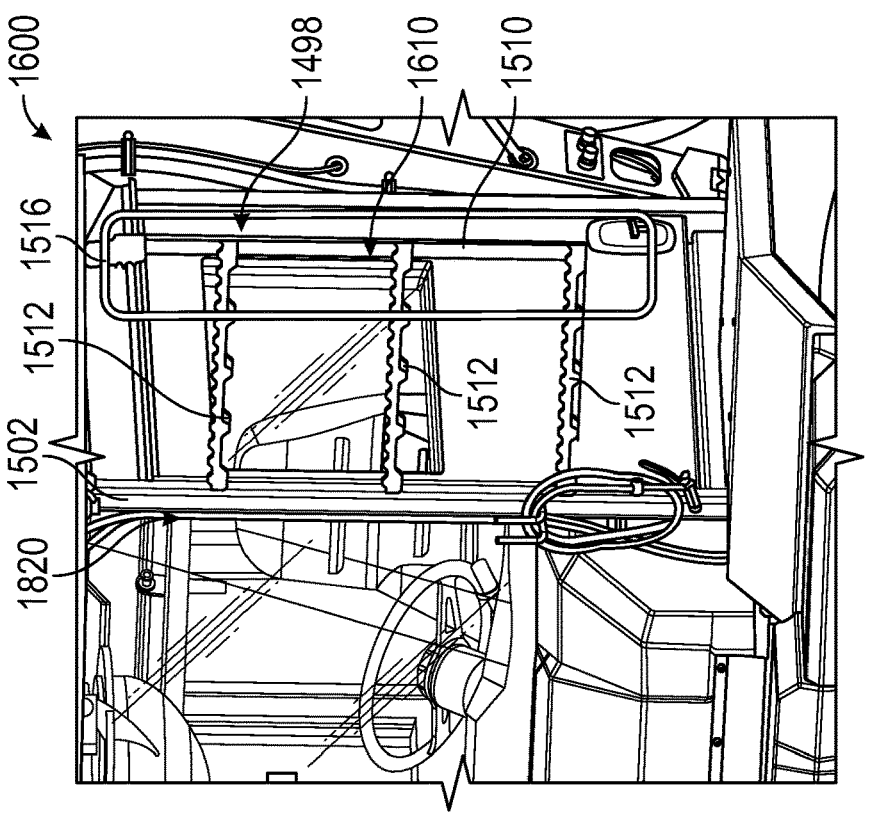
FIG. 16 is front perspective view of a portion of the superstructure of FIG. 15, according to an example embodiment.

Turning to FIGS. 16 and 17, a superstructure 1600 is shown. The superstructure 1600 includes the ladder 1498 of FIG. 15. Accordingly, like numbering is used to designate similar components between the superstructure 1600 and the superstructure 1500. FIG. 16 shows the view width (e.g., width as perceived from a vantage point) of ladder rail 1510 at a first view position 1610 and FIG. 17 shows the view width of the ladder rail 1510 at a second view position 1710. The second view position 1710 is an angled view position compared to the first view position 1610, such that the second view position 1710 is a similar angle to that an operator would view the ladder 1498 when in the cab 18 operating the concrete mixer truck 10. In other words, the coupling plate 1516, the plurality of rungs 1512, and the ladder rail 1510 are angled such that when positioned and installed onto the superstructure 1600 provide less obstruction in the field of view of the operator of the concrete mixer truck 10.

Turning to FIG. 18B, the superstructure 1600 of the improved visibility ladder 1498 is shown from the perspective of an operator in the cab 18. As shown in FIG. 18B, the ladder 1498 is seen by the operator as having a very thin ladder rail 1510 and a narrow plurality of rungs 1512. That is, the ladder 1498 of the superstructure 1600 is very thin compared to a conventional ladder 1898 of a conventional superstructure 1800 (shown in FIG. 18A). As shown, the conventional ladder 1898 includes a conventional ladder rail 1810 and a plurality of rungs 1812 that are wider than the ladder rail 1510 and plurality of rungs 1512 of the ladder 1498. Further, the side mirror 1806 of the superstructure 1600 is positioned at a more convenient angle that provides greater visibility and less blind spots compared to the conventional mounting and angle of the side mirror 1802 of the ladder 1898.

Figure 19:
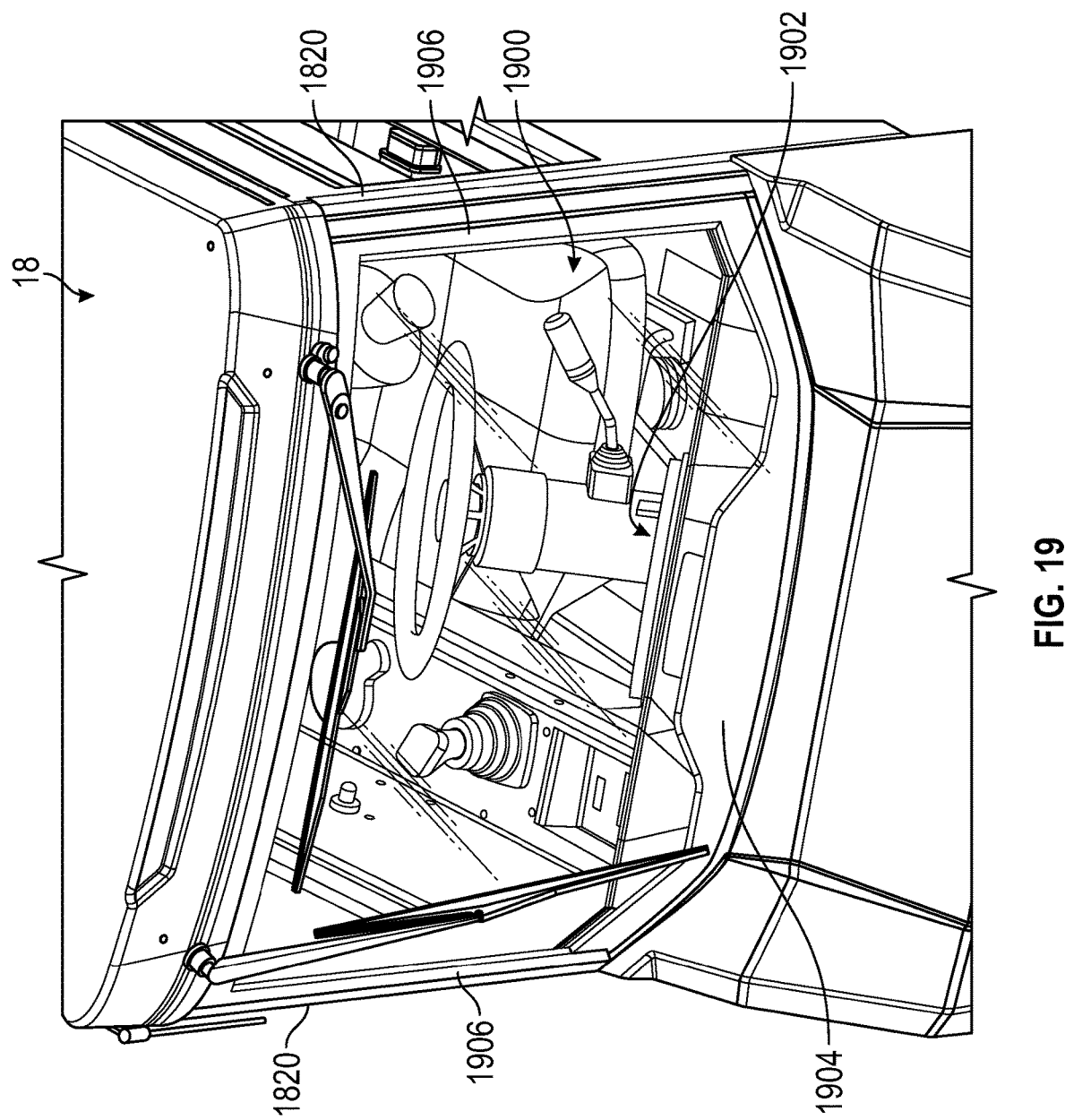
FIG. 19 is a top perspective view of a windshield coupled to the superstructure of FIG. 16, according to an example embodiment.

Turning to FIG. 19, a larger, curved windshield 1900 may be implemented within the cab 18 to provide greater visibility. To maximize visibility the windshield 1900 may be a single piece of glass that mounts to vertical pillars 1820 on the cab 18. The windshield 1900 includes a curved portion 1906 on each side of the windshield adjacent the vertical pillars 1820. A central sloped portion 1904 extends between the two end curved portions 1906 and slopes forward to allow space for the instrument panel 1902.

Flexible Bar-Pin Bushing Rod

Referring to FIG. 20, a superstructure 2000 is shown, according to an example embodiment. The superstructure 2000 of FIG. 20 is similar to the superstructure 1500 of FIG. 15. A difference between the superstructure 2000 and the superstructure 1500 is the superstructure 2000 has a first chassis support member without a wheel accommodating portion. Accordingly, like numbering is used to designate similar components between the superstructure 2000 and the superstructure 1600. The first pillar 1502 includes the first pillar top 1520 that includes the first bar-pin coupling member 1530 coupled to a platform coupling member 2130 (shown in FIG. 21) on the platform 54 and a first pillar bottom 1522 that includes the second bar-pin coupling member 1532 coupled to the first chassis support member 2078. The first chassis support member 2078 includes a chassis coupling surface 1562 that is configured to couple to an outer surface of the frame rail 40 on the first lateral side 142. A support arm 2058 extends from a bottom of the chassis coupling surface 1562 upward to a base portion 2060 that receives and is coupled to the second bar-pin coupling member 1532.

Figure 21:
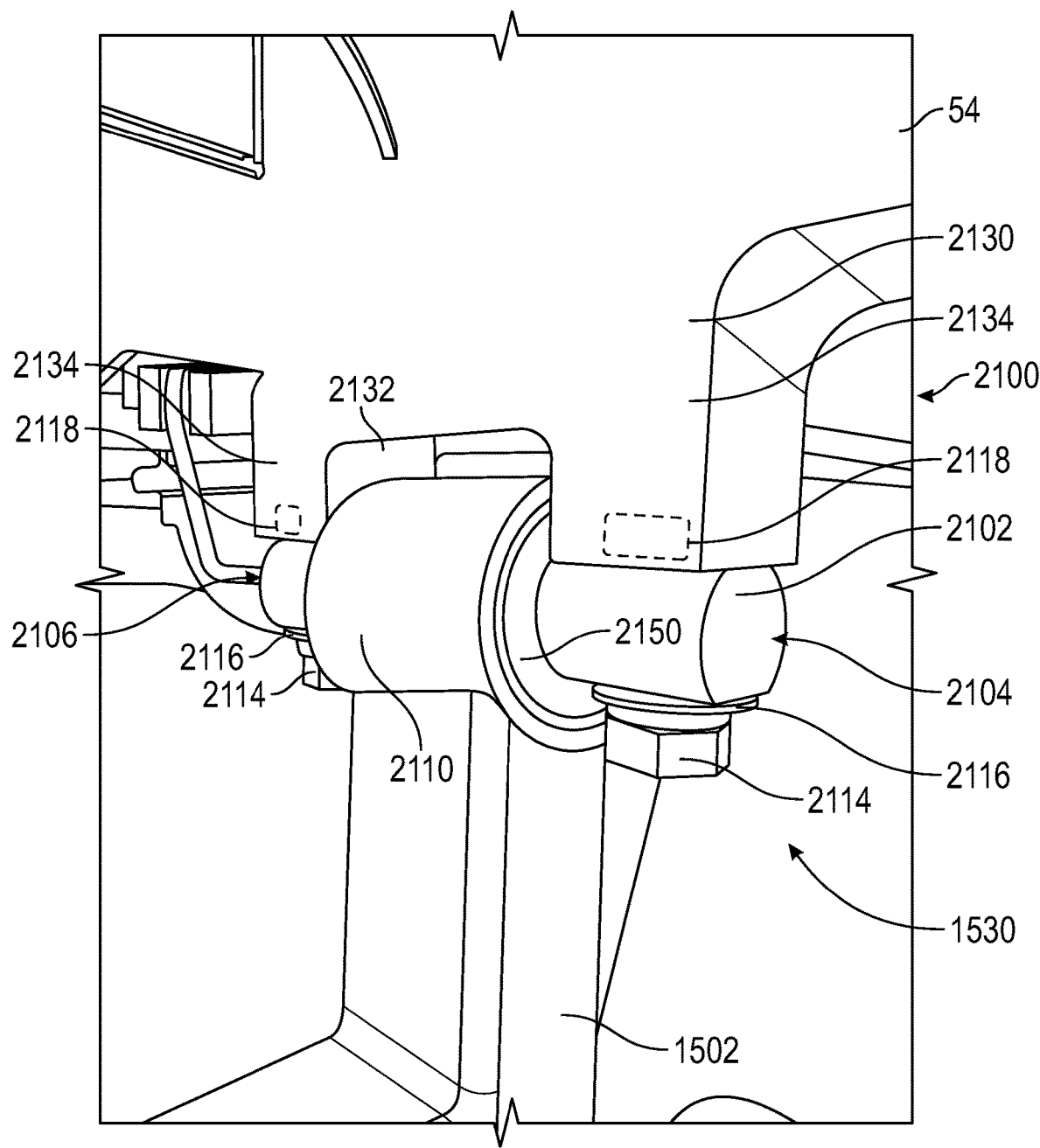
FIG. 21 is a portion of the superstructure of FIG. 20, according to an example embodiment.

Referring to FIG. 21, a portion 2100 of the superstructure 2000 focused on the coupling of the first bar-pin coupling member 1530 and the platform 54 is shown. The platform 54 includes a platform coupling member 2130 that is "U"-shaped. The platform coupling member 2130 includes a recessed portion 2132 that allows the joint member 2110 of the first bar-pin coupling member 1530 to flex and move. A protruding portion 2134 is disposed on both sides of the recessed portion 2132. Each protruding portion 2134 includes a connecting portion 2118 to receive a complementary fastener 2114 of the first bar-pin coupling member 1530. The connection portion 2118 may be a threaded member and/or nut configured to receive a bolt fastener 2114. The first bar-pin coupling member 1530 includes a joint member 2110 with an assembly pin 2102 extending laterally through an opening in the joint member 2110. In some embodiments, a bushing 2150 is disposed in the opening of the joint between the joint member 2110 and the assembly pin 2102. Beneficially, the bushing 2150 is configured to keep the joint member 2110 from wearing, vibrating, or making noise that may distract or annoy the operators and may be replaced. The bushing 2150 may be a polymeric wear resistant material, a dampening material, or another low-friction material.

The assembly pin 2102 of the first bar-pin coupling member 1530 includes a first pin end 2104 and a second pin end 2106 disposed laterally away from the first pin end 2104. The first pin end 2104 includes an opening therethrough configured to receive a fastener 2114. The second pin end includes an opening therethrough configured to receive a fastener 2114. As shown in FIG. 21, a washer 2116 is disposed between the fastener 2114 and an end of the first pin end 2104 to minimize wear on each element and dampen vibrations and noise. A washer 2116 is disposed between the fastener 2114 and an end of the second pin end 2106 to minimize wear on each element and dampen vibrations and noise.

To assemble the first bar-pin coupling member 1530, the bushing 2150 is placed around the assembly pin 2102 such that a central portion of the assembly pin 2102 is surrounded by the bushing 2150. The assembly pin 2102 and bushing 2150 are inserted through the opening in the joint member 2110 such that the first pin end 2104 and the second pin end 2106 are equidistance from the center of the joint member 2110. The bushing 2150 and the assembly pin 2102 pivotally interface with the joint member 2110. A pair of fasteners 2114 with washers 2116 are inserted through an opening axially formed within each of the first pin end 2104 and the second pin end 2106. Each fastener 2114 is configured to engage a complementary connection portion 2118 disposed within each protruding portion 2134 of the platform coupling member 2130. A technician may easily replace the first pillar 1502 and/or a component of the first bar-pin coupling member 1530 by uncoupling the pair of fasteners 2114 and the complementary connection portion 2118. As will be appreciated, the third bar-pin coupling member 1554 of the second pillar 1504 is coupled to the platform 54 in a similar manner using similar components as described above with respect to the first bar-pin coupling member 1530 of the first pillar 1502.

Figure 22:
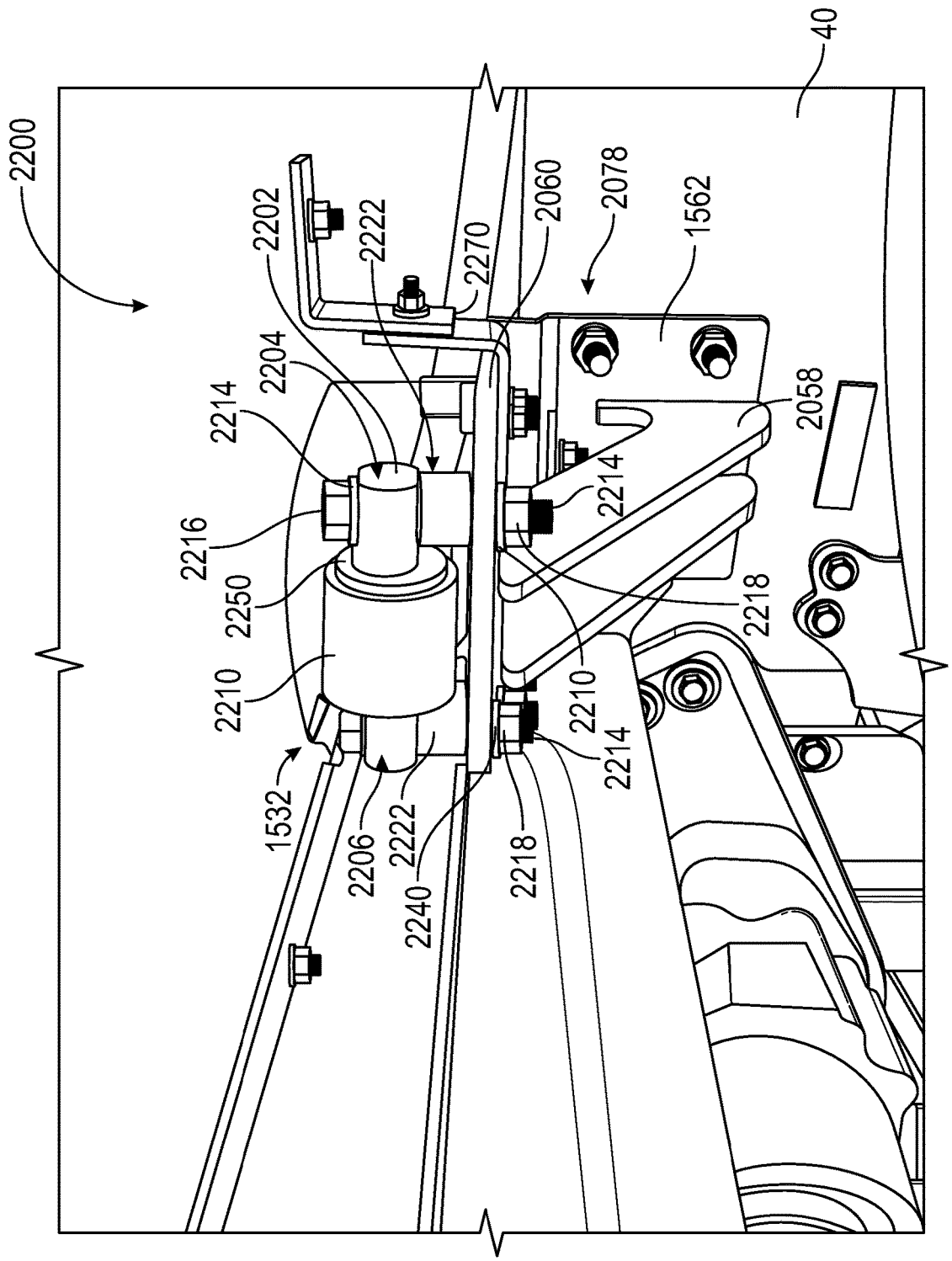
FIG. 22 is another portion of the superstructure of FIG. 20, according to an example embodiment.

Referring to FIG. 22, a portion 2200 of the superstructure 2000 focused on the coupling of the second bar-pin coupling member 1532 and the first chassis support member 2078 is shown. As shown in FIG. 22, a support bracket 2270 is coupled to the base portion 2060. The first chassis support member 2078 includes a chassis coupling surface 1562 that is configured to couple to an outer surface of the frame rail 40 on the first lateral side 142. A support arm 2058 extends from a bottom of the chassis coupling surface 1562 upward to a base portion 2060 that receives and is coupled to the second bar-pin coupling member 1532. The base portion 2060 includes a pair of openings 2240 formed therethrough that are configured to receive fasteners 2214. A washer 2222 is disposed above each opening 2240 to provide clearance between the joint member 2210 and the base portion 2060. In some embodiments, the washer 2222 is configured to minimize wear on each element and dampen vibrations and noise. A connector 2218 is disposed below each opening 2240 to receive the fastener 2214. As shown in FIG. 22, the fastener 2214 is a bolt and the connector 218 is a nut.

The second bar-pin coupling member 1532 includes a joint member 2210 with an assembly pin 2202 extending laterally through an opening in the joint member 2210. In some embodiments, a bushing 2250 is disposed in the opening of the joint between the joint member 2210 and the assembly pin 2202. Beneficially, the bushing 2250 is configured to keep the joint member 2210 from wearing, vibrating, or making noise that may distract or annoy the operators and may be replaced. The bushing 2250 may be a polymeric wear resistant material, a dampening material, or another low-friction material. The assembly pin 2202 of the second bar-pin coupling member 1532 includes a first pin end 2204 and a second pin end 2206 disposed laterally away from the first pin end 2204. The first pin end 2204 includes an opening therethrough configured to receive a fastener 2214. The second pin end includes an opening therethrough configured to receive a fastener 2214.

To assemble the second bar-pin coupling member 1532, the bushing 2250 is placed around the assembly pin 2202 such that a central portion of the assembly pin 2202 is surrounded by the bushing 2250. The assembly pin 2202 and bushing 2250 are inserted through the opening in the joint member 2210 such that the first pin end 2204 and the second pin end 2206 are equidistance from the center of the joint member 2210. The bushing 2250 and assembly pin 2202 pivotally interface with the joint member 2210. A pair of fasteners 2214 with flared portions 2216 are inserted through an opening axially formed within each of the first pin end 2204 and the second pin end 2206. Each fastener 2214 is configured to pass through an opening 2240 in the base portion 2060 and engage a complementary connector 2218. A technician could easily replace the first pillar 1502 and/or a component of the second bar-pin coupling member 1532 by uncoupling the pair of fasteners 2214 and the complementary connector 2218. As will be appreciated, the fourth bar-pin coupling member 1552 of the second pillar 1504 is coupled to a second chassis support member 1574 in a similar manner using similar components as described above with respect to the second bar-pin coupling member 1532 of the first pillar 1502.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10 and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A concrete mixer vehicle comprising:
a chassis having a frame;
an engine coupled to the frame;
a cab coupled to the frame, the cab defining an interior compartment;
a drum assembly including:
a mixing drum defining an aperture and an internal volume;
a drum driver configured to selectively rotate the mixing drum relative to the chassis; and
a hopper assembly configured to introduce materials into and allow the materials to flow out of the internal volume of the mixing drum;
a front roller pedestal coupled to the frame and configured to support a front end of the mixing drum;
a transmission mounting bracket assembly; and
a rear pedestal coupled to the frame and configured to support a rear end of the mixing drum, the rear pedestal having a pedestal frame, a first mounting bracket, a second mounting bracket, a coupling brace, a first bar-pin member, and a second bar-pin member, the pedestal frame having a first frame end and a second frame end, the first frame end coupled to and supporting the drum driver, the second frame end disposed opposite the first frame end and including a first interface joint and a second interface joint, the first interface joint being coupled to the frame by the first mounting bracket and the second interface joint being coupled to the frame by the second mounting bracket, the coupling brace being coupled to the pedestal frame proximate the first frame end, each of the first bar-pin member and the second bar-pin member being coupled to the coupling brace at a first end and to the transmission mounting bracket assembly at a second end.

2. The concrete mixer vehicle of claim 1, wherein the transmission mounting bracket assembly includes a first pair of brackets configured to provide a first installation position and a second pair of brackets configured to provide a second installation position, the first installation position allowing for a short drum configuration, the second installation position allowing for a long drum configuration, and the second ends of the first bar-pin member and the second bar-pin member are each coupled to a corresponding bracket of the first pair of brackets or the second pair of brackets depending on a length of the mixing drum.

3. The concrete mixer vehicle of claim 2, wherein the second ends of the first bar-pin member and the second bar-pin member are each coupled to a corresponding bracket of the first pair of brackets.

4. The concrete mixer vehicle of claim 2, wherein each of the first interface joint and the second interface joint comprises a flexible joint member.

5. The concrete mixer vehicle of claim 4, wherein the flexible joint member includes a bushing configured to dampen energy transmitted through the flexible joint member.

6. The concrete mixer vehicle of claim 5, wherein the first mounting bracket couples the first interface joint to a web of the frame and the second mounting bracket couples the second interface joint to the web of the frame.

7. The concrete mixer vehicle of claim 6, further comprising:
a superstructure coupled to an upper portion of the front roller pedestal and at least partially supported by the cab, the superstructure including:
a first pillar;
a second pillar; and
a ladder including a ladder rail and a plurality of ladder rungs, wherein the ladder rail and the plurality of ladder rungs are positioned to extend in a direction that is parallel to a sight line of an operator sitting in the cab.

8. The concrete mixer vehicle of claim 7, wherein the first pillar is positioned behind a first a-pillar of the cab and the second pillar is positioned behind a second a-pillar of the cab.

9. The concrete mixer vehicle of claim 1, wherein the first end of each of the first bar-pin member and the second bar-pin member is coupled to the coupling brace using a bushing configured to dampen energy transmitted through the bushing.

10. A concrete mixer vehicle comprising:
a chassis having a frame;
an engine coupled to the frame;
a cab coupled to the frame, the cab defining an interior compartment;
a drum assembly including:
a mixing drum defining an aperture and an internal volume;
a drum driver configured to selectively rotate the mixing drum relative to the chassis; and
a hopper assembly configured to introduce materials into and allow the materials to flow out of the internal volume of the mixing drum;
a front roller pedestal coupled to the frame and configured to support a front end of the mixing drum, the front roller pedestal including a pedestal frame, a first mounting bracket, a second mounting bracket, and a support member, the pedestal frame having an upper portion and a lower portion, the upper portion including a pair of drum drive rollers configured to receive and facilitate rolling of the mixing drum, the lower portion including a first interface joint coupled to the frame by the first mounting bracket and a second interface joint coupled to the frame by the second mounting bracket, the support member having a first end and a second end, the first end of the support member being coupled to the upper portion of the pedestal frame and the second end of the support member being coupled to the frame of the chassis, the support member being configured to provide support to the pedestal frame in a longitudinal direction with respect to a longitudinal axis of the frame; and
a rear pedestal coupled to the frame and configured to support a rear end of the mixing drum.

11. The concrete mixer vehicle of claim 10, wherein each of the first interface joint and the second interface joint comprises a flexible joint member.

12. The concrete mixer vehicle of claim 11, wherein the flexible joint member includes a bushing configured to dampen energy transmitted through the flexible joint member.

13. The concrete mixer vehicle of claim 12, further comprising:
a superstructure coupled to the upper portion of the front roller pedestal and at least partially supported by the cab, the superstructure including:
a first pillar positioned behind a first a-pillar of the cab;
a second pillar positioned behind a second a-pillar of the cab; and
a ladder including a ladder rail and a plurality of ladder rungs,
wherein the ladder rail and the plurality of ladder rungs are positioned to extend in a direction that is parallel to a sight line of an operator sitting in the cab.

14. The concrete mixer vehicle of claim 13, wherein the support member is a curved support bar configured to provide clearance for a water tank supported by the frame.

15. The concrete mixer vehicle of claim 13, wherein the support member is a straight support bar configured to provide clearance for a water tank supported by the frame.

16. A concrete mixer vehicle comprising:
a chassis having a frame;
an engine coupled to the frame;
a cab coupled to the frame, the cab defining an interior compartment;
a drum assembly including:
a mixing drum defining an aperture and an internal volume;
a drum driver configured to selectively rotate the mixing drum relative to the chassis; and
a hopper assembly configured to introduce materials into and allow the materials to flow out of the internal volume of the mixing drum;
a front roller pedestal coupled to the frame and configured to support a front end of the mixing drum, the front roller pedestal including a front pedestal frame, a first front mounting bracket, a second front mounting bracket, and a support member, the front pedestal frame having an upper portion and a lower portion, the upper portion including a pair of drum drive rollers configured to receive and facilitate rolling of the mixing drum, the lower portion being coupled to the frame by the first front mounting bracket and the second front mounting bracket, the support member being configured to provide support to the front pedestal frame in a longitudinal direction with respect to a longitudinal axis of the frame;
a transmission mounting bracket assembly; and
a rear pedestal coupled to the frame and configured to support a rear end of the mixing drum, the rear pedestal having a rear pedestal frame, a first rear mounting bracket, a second rear mounting bracket, a coupling brace, a first bar-pin member, and a second bar-pin member, the rear pedestal frame having a first frame end and a second frame end, the first frame end coupled to and supporting the drum driver, the second frame end disposed opposite the first frame end and being coupled to the frame by the first rear mounting bracket and the second rear mounting bracket, the coupling brace being coupled to the rear pedestal frame proximate the first frame end, each of the first bar-pin member and the second bar-pin member being coupled to the coupling brace at a first end and to the transmission mounting bracket assembly at a second end.

17. The concrete mixer vehicle of claim 16, wherein the transmission mounting bracket assembly includes a first pair of brackets configured to provide a first installation position and a second pair of brackets configured to provide a second installation position, the first installation position allowing for a short drum configuration, the second installation position allowing for a long drum configuration, and the second ends of the first bar-pin member and the second bar-pin member are each coupled to a corresponding bracket of the first pair of brackets or the second pair of brackets depending on a length of the mixing drum.

18. The concrete mixer vehicle of claim 17, wherein the lower portion of the front roller pedestal is flexibly coupled to the frame, via the first front mounting bracket and the second front mounting bracket, by a front pair of flexible joint members and the second frame end of the rear pedestal is flexibly coupled to the frame, via the first rear mounting bracket and the second rear mounting bracket, by a rear pair of flexible joint members.

19. The concrete mixer vehicle of claim 18, further comprising:
- a superstructure coupled to the upper portion of the front roller pedestal and at least partially supported by the cab, the superstructure including:
- a first pillar;
- a second pillar; and
- a ladder including a ladder rail and a plurality of ladder rungs,
- wherein the ladder rail and the plurality of ladder rungs are positioned to extend in a direction that is parallel to a sight line of an operator sitting in the cab.

20. The concrete mixer vehicle of claim 19, wherein the first pillar is positioned behind a first a-pillar of the cab and the second pillar is positioned behind a second a-pillar of the cab.

* * * * *